US008223193B2

(12) United States Patent
Zhao et al.

(10) Patent No.: US 8,223,193 B2
(45) Date of Patent: Jul. 17, 2012

(54) TARGETS, FIXTURES, AND WORKFLOWS FOR CALIBRATING AN ENDOSCOPIC CAMERA

(75) Inventors: Tao Zhao, Sunnyvale, CA (US); Wenyi Zhao, Mountain View, CA (US); David D. Scott, Oakland, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 662 days.

(21) Appl. No.: 12/415,377

(22) Filed: Mar. 31, 2009

(65) Prior Publication Data

US 2010/0245541 A1 Sep. 30, 2010

(51) Int. Cl.
*H04N 13/00* (2006.01)
*H04N 15/00* (2006.01)
*A61B 1/04* (2006.01)

(52) U.S. Cl. ............... 348/45; 348/42; 348/46; 382/128
(58) Field of Classification Search ............. 348/42, 348/45, 46; 382/128
See application file for complete search history.

(56) References Cited

U.S. PATENT DOCUMENTS

| | | | |
|---|---|---|---|
| 5,950,629 A | | 9/1999 | Taylor et al. |
| 5,953,112 A * | | 9/1999 | Rosow et al. ............... 356/73.1 |
| 6,468,265 B1 | | 10/2002 | Evans et al. |
| 7,277,120 B2 | | 10/2007 | Gere et al. |
| 8,052,598 B2 * | | 11/2011 | Groszmann ............... 600/168 |
| 2003/0007672 A1 * | | 1/2003 | Harman et al. ............ 382/128 |
| 2006/0258938 A1 | | 11/2006 | Hoffman et al. |
| 2007/0156021 A1 * | | 7/2007 | Morse et al. ............... 600/167 |
| 2008/0240558 A1 * | | 10/2008 | Li et al. ..................... 382/167 |

FOREIGN PATENT DOCUMENTS

WO WO-2006124388 A1 11/2006

OTHER PUBLICATIONS

Atkins, Bob, "MTF and SQF," last modified May 16, 2008, 16 pages; Internet: http://www.bobatkins.com/photography/technical/mtf/mtf1.html.
Backman, Sampo M. and Anssi J. Makynen, "Random target method for fast MFT inspection," Optics Express, vol. 12, No. 12, pp. 2610-2615, Jun. 14, 2004.
Burns, Peter D., "Slanted-Edge MTF for Digital Camera and Scanner Analysis," 2000 Society for Imaging Science and Technology International Conference on Digital Photography, ISandT 2000 PICS Conference, pp. 135-138, 2000. Available online at: http://imagescienceassociates.com/pubs/26pics2000burns.pdf.
Ducharme, Alfred D., "Using random test patterns to evaluate MTF," Sine Patterns, LLC, Engineering Note, New York, Mar. 12, 2002, 8 pages.

(Continued)

*Primary Examiner* — Liangche A Wang

(57) ABSTRACT

The present disclosure relates to calibration assemblies and methods for use with an imaging system, such as an endoscopic imaging system. A calibration assembly includes: an interface for constraining engagement with an endoscopic imaging system; a target coupled with the interface so as to be within the field of view of the imaging system, the target including multiple of markers having calibration features that include identification features; and a processor configured to identify from first and second images obtained at first and second relative spatial arrangements between the imaging system and the target, respectively, at least some of the markers from the identification features, and using the identified markers and calibration feature positions within the images to generate calibration data.

24 Claims, 26 Drawing Sheets

OTHER PUBLICATIONS

Fiala, Mark and Chang Shu, "Self-Identifying Patterns for Plane-Based Camera Calibration," Pattern Recognition and Machine Learning, vol. 19, No. 4, Jul. 2008, pp. 209-216; first published online Aug. 3, 2007, Springer.

Fiala, Mark, "ARTag Revision 1. A Fiducial Marker System Using Digital Techniques," National Research Council of Canada, NRC/ERB1117, Nov. 24, 2004, 46 pages; Internet: http://nparc.cisti-icist.nrc-cnrc.gc.ca/npsl/ctrl?action=rtdocandan=5765376andarticle=0.

Heikkila, Janni and Olli Silven, "A four-step camera calibration procedure with implicit image correction," 1997 IEEE Computer Society Conference on Computer Vision and Pattern Recognition, Jun. 17-19, 1997, pp. 1106-1112.

Horn, Berthold K.P., "Tsai's camera calibration method revisited," 2000. 13 pages: Internet: http://people.csail.mit.edu/bkph/articles/Tsai_Revisited.pdf.

Shahidi, Ramin et al., "Implementation, Calibration and Accuracy Testing of an Image-Enhanced Endoscopy System," IEEE Transactions on Medical Imaging, 2002, pp. 1524-1535, vol. 21—Issue 12, IEEE.

Smith, Steven W., Chapter 25: "Special Imaging Techniques," of *The Scientist and Engineer's Guide to Digital Signal Processing*, 1997, California Technical Publishing, San Diego, California, pp. 423-450.

Vertut, Jean et al., Robot Technology: Teleoperation and Robotics Evolution and Development, 1986, vol. 3A, 332 pages, English translation Prentice-Hall, Inc., Inglewood Cliffs, NJ, USA.

Wengert, Christian et al., "Fully Automatic Endoscope Calibration for Intraoperative Use," Computer Vision Laboratory, ETH, Zurich, Switzerland, Mar. 2006, 5 pages; Internet: http://www.vision.ee.ethz.ch/publications/get_abstract.cgi?procs=381andlang=en.

Williams, Don and Peter D. Burns, "Diagnostics for Digital Capture using MTF," Proceedings of Society for Imaging Science and Technology (IS&T) 2001 Image Processing, Image Quality, Image Capture Systems Conference (PICS-01), Montreal, Quebec, Canada; Apr. 22-25, 2001, pp. 227-332; Internet: http://www.scribd.com/doc/13662354/Diagnostics-for-Digital-Capture-Using-MTF.

* cited by examiner

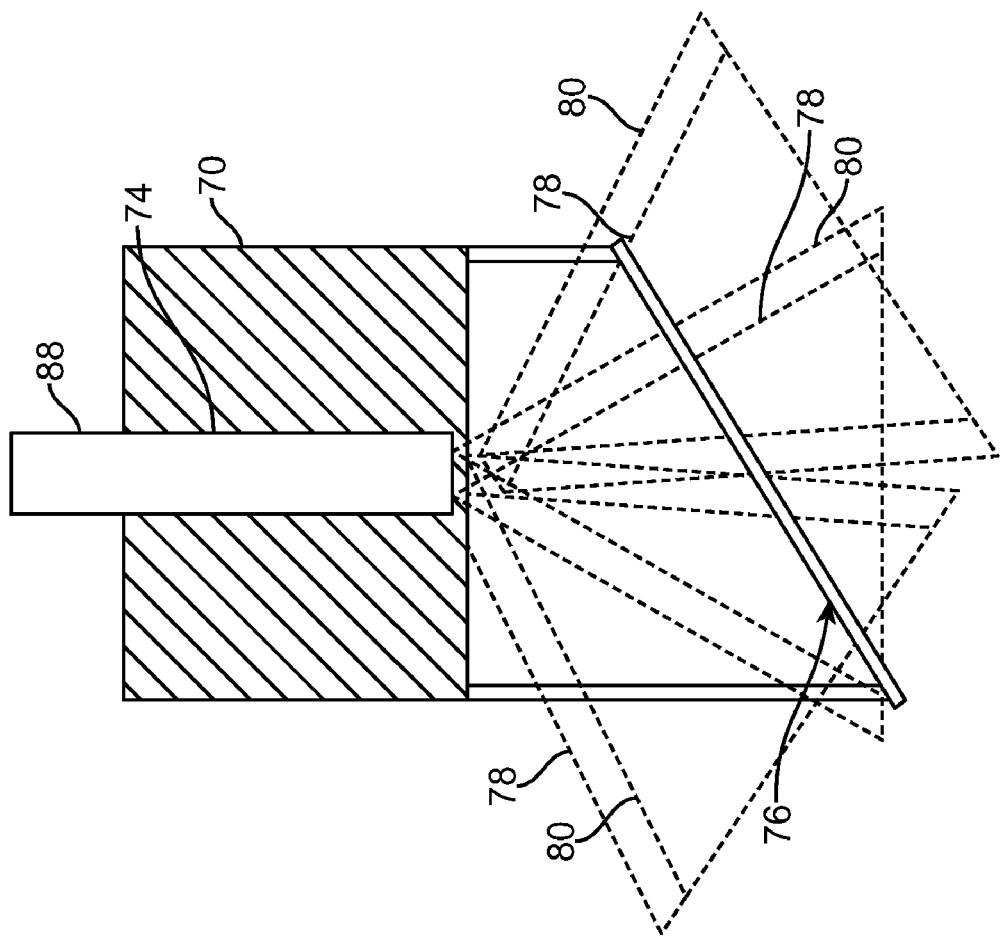
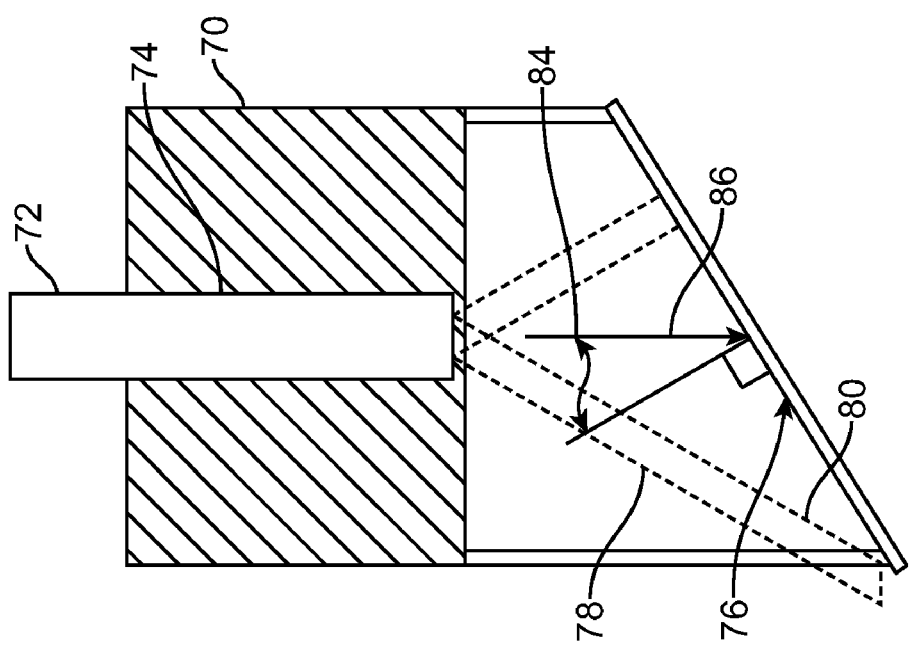
FIG. 3B
FIG. 3A

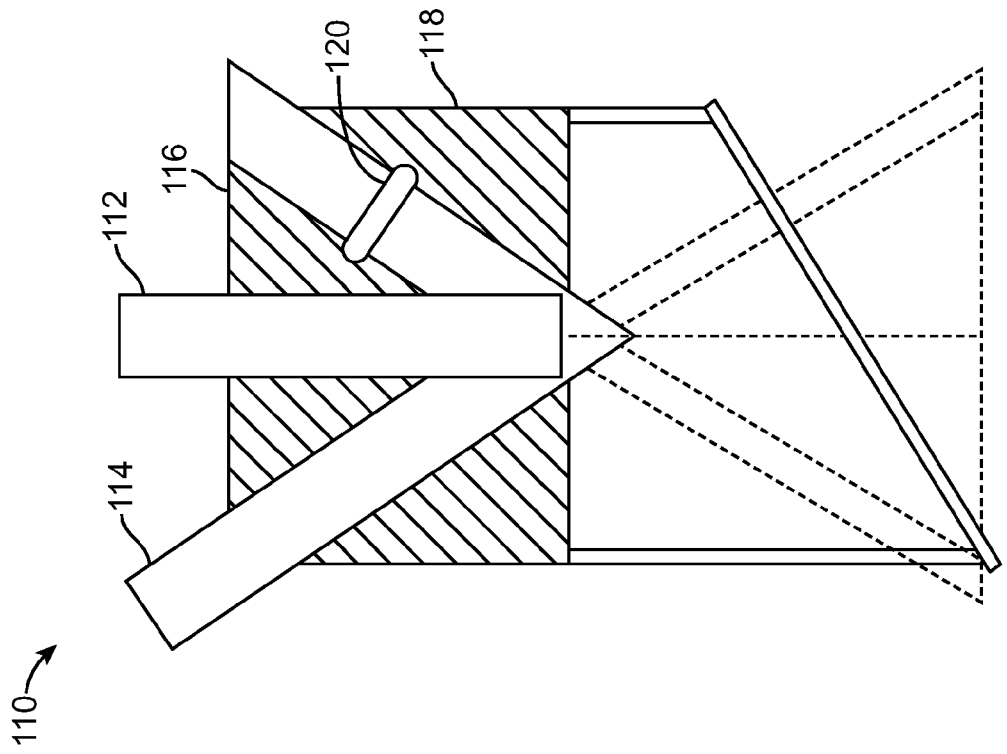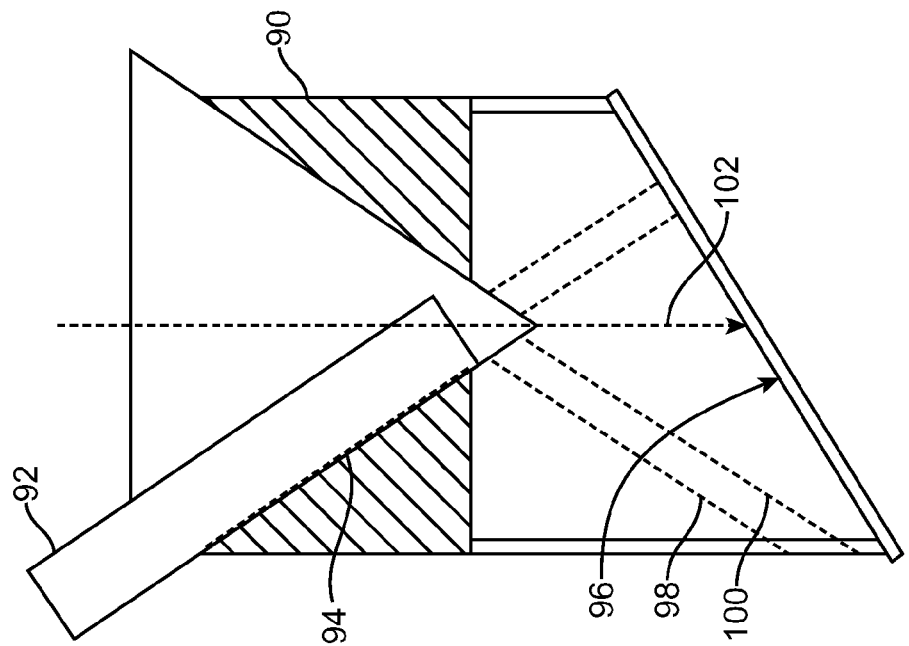
FIG. 4B
FIG. 4A

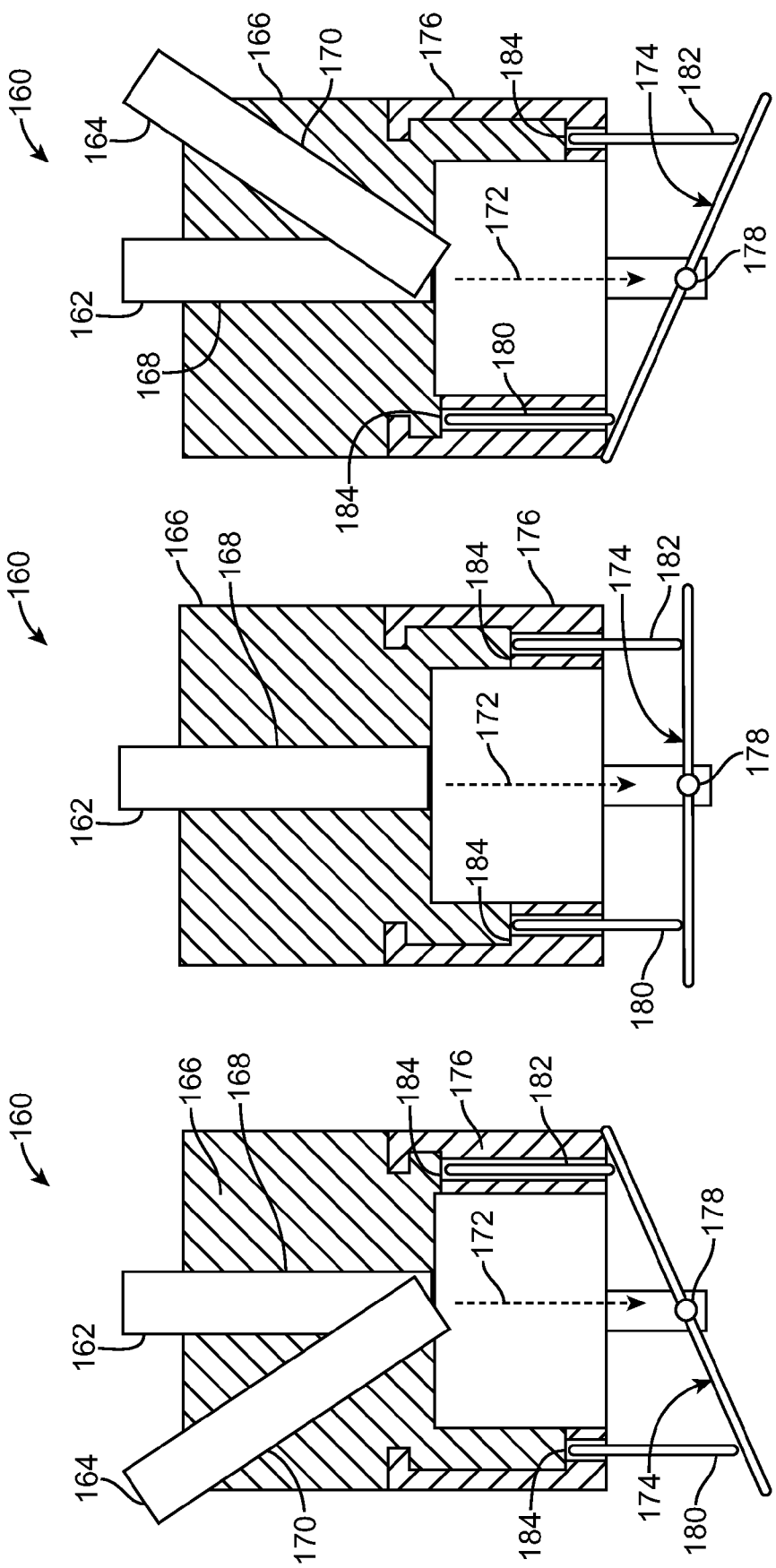

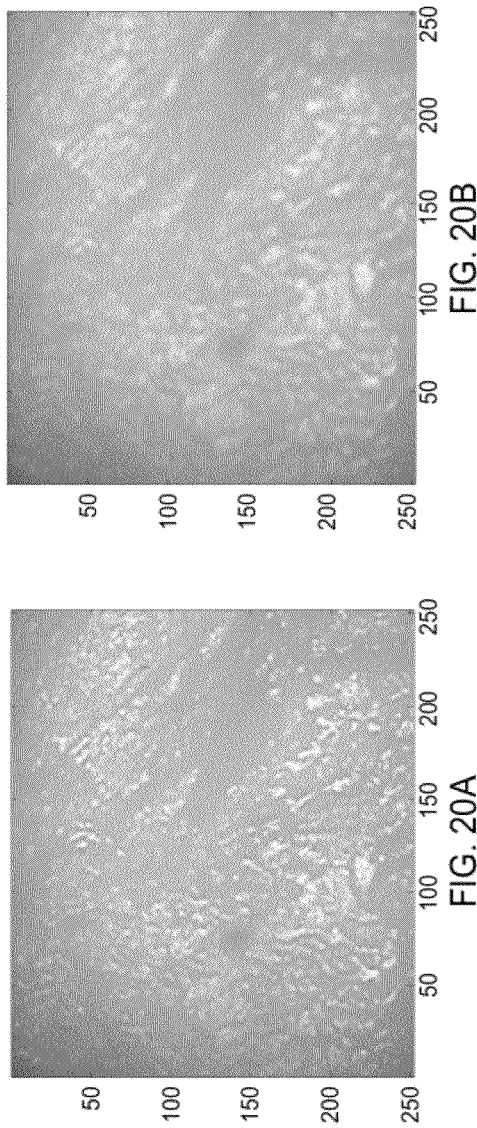
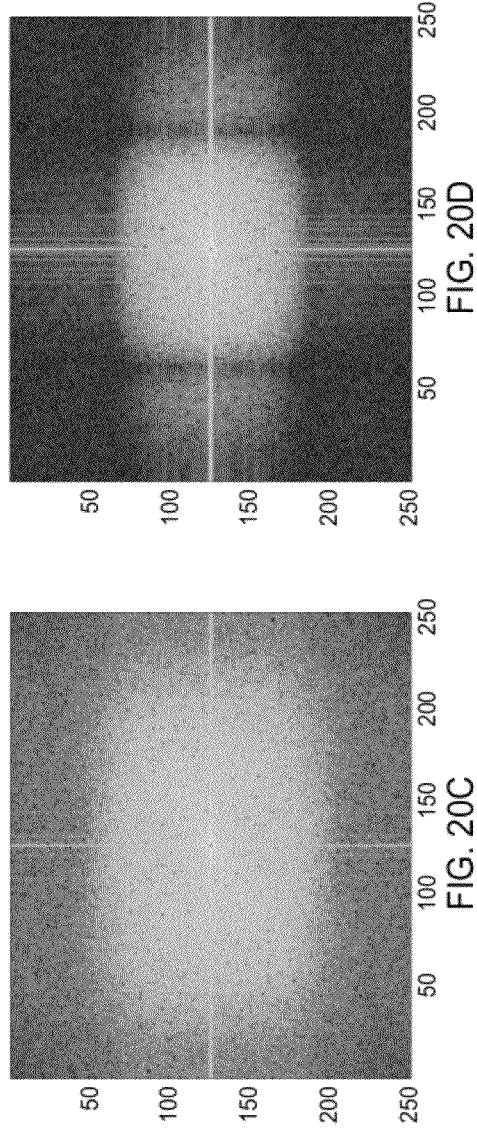
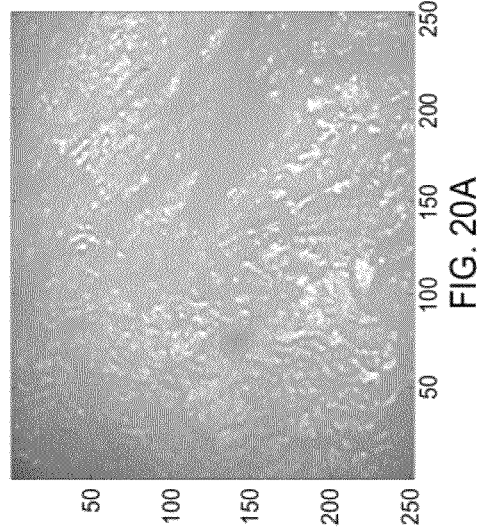
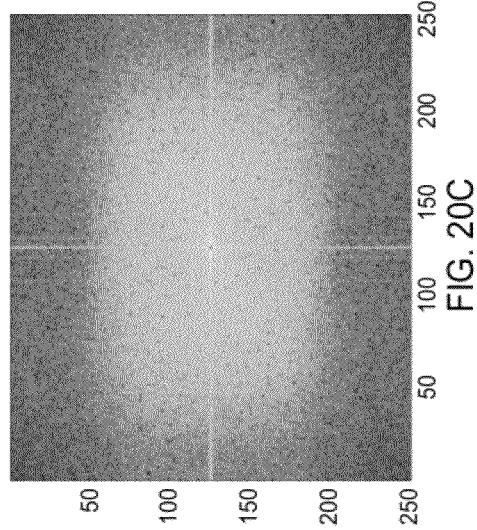

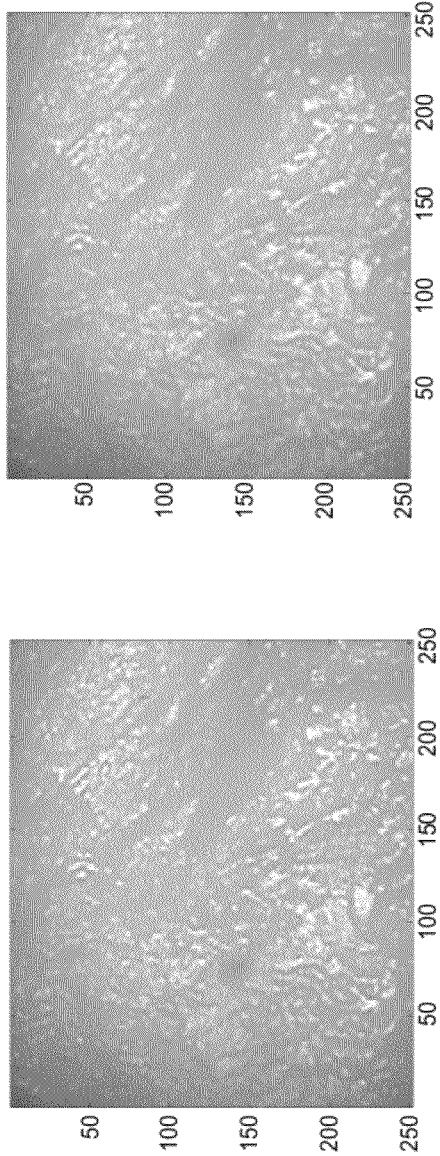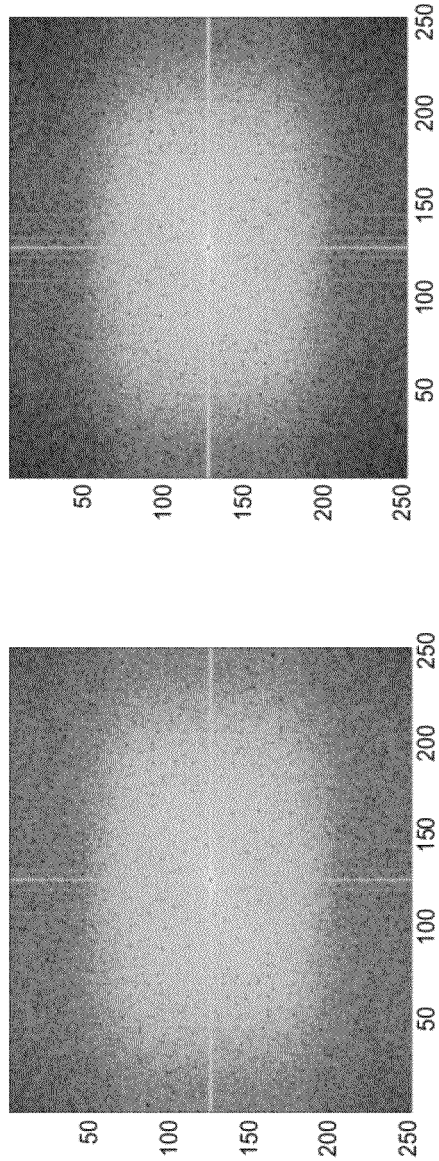

TARGETS, FIXTURES, AND WORKFLOWS FOR CALIBRATING AN ENDOSCOPIC CAMERA

BACKGROUND

Minimally invasive surgical techniques are aimed at reducing the amount of extraneous tissue that is damaged during diagnostic or surgical procedures, thereby reducing patient recovery time, discomfort, and deleterious side effects. As a consequence, the average length of a hospital stay for standard surgery may be shortened significantly using minimally invasive surgical techniques. Also, patient recovery time, patient discomfort, surgical side effects, and time away from work may also be reduced with minimally invasive surgery.

A common form of minimally invasive surgery is endoscopy, and a common form of endoscopy is laparoscopy, which is minimally invasive inspection and surgery inside the abdominal cavity. In standard laparoscopic surgery, a patient's abdomen is insufflated with gas, and cannula sleeves are passed through small (approximately ½ inch or less) incisions to provide entry ports for laparoscopic instruments. Laparoscopic surgical instruments generally include a laparoscope or an endoscope for viewing the surgical field.

An endoscope can be calibrated prior to use. Calibration is the process of determining intrinsic and extrinsic parameters for an imaging device by projecting three-dimensional (3-D) points into an image. Intrinsic parameters involve the internal geometric and optical characteristics of the imaging device, such as focal lengths in x and y, principal point in x and y, skew and pixel aspect ratio, and distortions (often quantified by a few parameters describing the distortions such as radial and tangential distortions). Intrinsic parameters can be used to compensate for imaging errors, such as optical aberrations of the imaging device. Extrinsic parameters involve the 3-D position of the camera reference coordinate system relative to a certain world coordinate system (i.e., six degree of freedom pose). In general, calibration is essential for many advanced imaging systems, such as advanced computer vision, 3-D augmented reality, 3-D visualization applications, advanced user interfaces, and image-guided surgery.

A stereoscopic imaging device, such as a stereo endoscope, is typically aligned at some point prior to use. The alignment process involves adjusting the left and right stereo images horizontally and vertically so as to have zero horizontal and vertical disparity at a certain distance. Without alignment, a viewer's eyes cannot properly fuse the left and right images (especially if the vertical disparity is large). Exemplary alignment methods and systems are described in commonly owned U.S. Pat. No. 7,277,120 (filed Mar. 7, 2004), which is hereby incorporated by reference. Calibration parameters for the two imaging paths of a stereo imaging device can provide parameters (horizontal and vertical offsets) of the alignment process.

Typical calibration methods involve imaging a calibration target. A calibration target typically has multiple features having known target relative coordinates. An image of the calibration target is processed so as to determine a collection of image coordinates associated with at least some of the target features. Known calibration methods can be used to process the collection of associated coordinates so as to generate calibration parameters, both extrinsic and intrinsic. (For exemplary methods, see Z. Zhang, "A flexible new technique for camera calibration," *IEEE trans. Pattern Analysis and Machine Intelligence,* 2000, volume 22, number 11, pages 1330-1334; and Janne Heikkila and Olli Silven, "A Four-step Camera Calibration Procedure with Implicit Image Correction," available at url <www.vision.caltech.edu/bouguetj/calib_doc/papers/heikkila97.pdf>, which are both hereby incorporated by reference.) Another method is implemented in a Matlab toolbox by Jean-Yves Bouguet (available at url <www.vision.caltech.edu/bouguetj/calib_doc/index.html>), which is a slightly modified version of the method described in the above-listed Zhang reference.

Calibration targets can be 3-D, two-dimensional (2-D), or one-dimensional (1-D). A 2-D target and related method(s) have a good balance of accuracy and convenience and are preferred in many applications. Calibration using planar targets requires multiple images of the target at different orientations so that the features being imaged have coordinates in three dimensions in any possible reference coordinate system, which is typically required by the matrix operations used to process the collection of associated coordinates. The exact poses of the target do not need to be known, since they can be estimated in the calibration process.

Existing methods used to extract obtain and process images of calibration targets suffer from a number of problems. For example, one calibration method involves imaging a checkerboard target pattern. The checkerboard pattern target must be properly positioned/oriented relative to the imaging device for multiple imaging directions. But properly placing the pattern as required by a calibration algorithm is not intuitive, and placement may therefore be difficult to guarantee. It can be especially difficult for non-technical persons to follow instructions directed to obtaining sufficiently different imaging directions. Additionally, since human hands are not very steady, holding the camera or target freehand typically induces motion blur. Some methods require manually designating corners of the pattern in the resulting images, such as the Matlab camera calibration tool box (see previous reference). As another example, the OpenCV computer vision library needs to have the number of grids of the pattern and requires that the full pattern be visible in an image.

There are some calibration methods that do not require manual designation. Some attach an attached optical tracking target to the calibration target to directly determine the 3-D information of the calibration target features (see Ramin Shahidi, Michael R. Bax, Calvin R. Maurer, Jr., Jeremy A. Johnson, Eric P. Wilkinson, Bai Wang, Jay B. West, Martin J. Citardi, Kim H. Wanwaring, and Rasool Khadem, "Implementation, Calibration and Accuracy Testing of an Image-Enhanced Endoscopy System," In *IEEE Transactions on Medical Imaging,* Vol. 21, No. 12, December 2002). Some add a few special features in the middle of the pattern that can be used to align the pattern with the image (see Christian Wengert, Mireille Reeff, Philippe C. Cattin, and Gabor Szekely, "Fully Automatic Endoscope Calibration for Intraoperative Use," In *Bildverarbeitung fur die Medizin Hamburg,* 2006). However, this requires that the special pattern to be visible in an image, which eliminates the potential use of non-overlapping images of the target. As such, further improvements in calibration target design remain desirable, particularly target features that can be readily associated with their resulting images. More recently, some use self-identifying patterns for camera calibration (see Mark Fiala and Chang Shu, "Self-identifying patterns for plane-based camera calibration," In *Machine Vision and Applications* (2008) 19:209-216). However, it does not provide a physical device/feature to interface with the imaging device to ensure that sufficient orientation variations have been captured and ease of use by non-technical users.

An endoscopic imaging system may also have its color balance (such as white balance) adjusted. In image processing, color balance involves the adjustment of the intensities of colors, typically the red, green, and blue primary colors. An important goal of this adjustment is to render specific colors correctly, particularly neutral colors. There are several aspects of image acquisition and display that result in a need for color balancing, including: that typical imaging device sensors do not match the sensors in the human eye, that the properties of the display medium impact the rendering of the color, and that the ambient conditions for the acquisition of the image may differ from the display viewing conditions. Color balance adjustment to keep neutral colors, such as white, neutral is sometimes called gray balance, neutral balance, or white balance, and this adjustment is a particularly important, if not dominant, element of color balancing.

It may also be advantageous to subject an endoscopic imaging system to diagnostic testing from time to time. A typical endoscopic imaging system includes a variety of components, such as imaging sensors, lens assemblies, etc., that may functionally degrade or fail over time. Where functional degradation that does not rise to an intolerable level has occurred, an endoscopic imaging system may continue to be used due to a lack of knowledge on the part of the user that any functional degradation has occurred. Such latent functional degradation may have significant detrimental consequences in a critical image-guided procedure, such as many minimally invasive surgeries.

While imaging device calibration, alignment, color balance, and diagnostic testing may be performed by using existing methods and devices, improved methods and assemblies for performing these tasks in a more convenient and efficient manner remain of interest. For example, methods and assemblies that can be conveniently used to perform these tasks all at once prior to a surgery would be of particular interest.

BRIEF SUMMARY

In accordance with various aspects, improved assemblies and methods are provided for generating calibration data, color balance data, and diagnostic data for an imaging device. Such assemblies and methods can be particularly advantageous when used to calibrate, adjust the color balance on, or run a diagnostic test on an endoscope prior to use. The provided assemblies and methods can be used, for example, to reduce the amount of time and labor required to calibrate an endoscope prior to use. The provided assemblies and methods may be less prone to errors in the form of accidentally missed steps, and they may result in improved imaging due to image system calibration and color balancing, as well as by avoiding the use of a functionally degraded endoscope.

Thus, the following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some aspects and embodiments of the invention in a simplified form as a prelude to the more detailed description that is presented later.

In accordance with an embodiment, a calibration assembly for use with an endoscopic imaging system having a field of view is provided. The calibration assembly includes an interface configured for constraining engagement with the endoscopic imaging system, a target coupled with the interface so as to be within the field of view, and a processor coupled with the imaging system. The calibration assembly is reconfigurable from a first relative spatial arrangement between the imaging system and the target to a second relative spatial arrangement between the imaging system and the target. The target includes multiple markers having calibration features that include identification features. The processor is configured to identify, from first and second images obtained at the first and second relative spatial arrangements, respectively, at least some of the markers from the identification features. The processor is configured to generate calibration data by using the identified markers and calibration feature positions within the images.

A calibration assembly can involve a number of options. For example, a calibration assembly can include a tangible medium that includes machine-readable instructions executable by the processor for processing the images. The interface can include a receptacle shaped to interface with a cylindrical portion of the imaging system. The target can be reconfigurable from the first relative spatial arrangement to the second relative spatial arrangement by reorienting the imaging system relative to the interface, and/or by reorienting the target relative to the interface. The calibration assembly can include a first portion having a fixed spatial arrangement relative to the interface and a second portion having a fixed spatial arrangement relative to the target, wherein the first and the second portion are rotationally coupled, or wherein the first and second portions are coupled so as to provide a plurality of different target normal directions and/or distances with respect to the imaging system. The features of one or more markers can be arranged in a two-dimensional pattern, and/or in a one-dimensional pattern. The processor can be configured to generate relative modulation transfer function (MTF) values for an image of the target. The target can include a straight edge feature separating dark and bright regions of the target and the processor can be configured to generate MTF values by processing an image region of interest that includes the edge feature. The processor can be configured to generate a color balance adjustment for the imaging system by processing a region of interest of an image of the target, and the color balance adjustment can include a white balance adjustment. The target can include a white background and non-white calibration features. The imaging system can include a stereoscopic endoscope.

In accordance with another embodiment, a calibration assembly for use with a stereoscopic endoscope imaging system having a field of view is provided. The calibration assembly includes an interface configured for constraining engagement with the endoscopic imaging system, a target coupled with the interface so as to be within the field of view, and a processor coupled with the imaging system. The calibration assembly is configurable to a relative spatial arrangement between the imaging system and the target. The processor is configured to determine one or more metrics for the imaging system. The one or more metrics can indicate whether a predetermined Focus Function focal position difference is exceeded, whether a predetermined Focus Function peak value difference is exceeded, whether a predetermined alignment shift value is exceeded, or whether an illumination level falls below a predetermined illumination level.

In accordance with another embodiment, a calibration target for use in calibrating an imaging system is provided. The calibration target can include multiple markers with each marker including multiple localizer features and multiple identification features. The localizer features have known relative positions on the target and can be used to determine an orientation for each marker. The identification features can be used to determine an identification for each marker to establish correspondence between image features and target features.

In accordance with another embodiment, a method for calibrating an endoscopic imaging system having a field of view is provided. The method involves using a calibration fixture having an interface for constraining engagement with the endoscopic imaging system and a target coupled with the interface so as to be within the field of view and reconfigurable between multiple spatial arrangements between the imaging system and the target. The method includes: using the calibration fixture to establish a first relative spatial arrangement between the target and the imaging system; imaging the target with the imaging system from the first relative spatial arrangement, the target including multiple markers that include calibration features that include identification features, the calibration features having known target relative locations; using the calibration fixture to establish a second relative spatial arrangement between the target and the imaging system; imaging the target with the imaging system from the second relative spatial arrangement; processing the images to generate data from the calibration features by identifying at least some of the markers using the identification features; and using the generated data to calibrate the endoscopic imaging system.

A method for calibrating an endoscopic imaging system can involve a number of options. For example, a method can include processing an image to generate relative MTF values. A method can include processing a region of interest of one of the images to determine MTF values from a straight edge feature that separates dark and bright regions. A method can include processing a region-of-interest of one of the images to determine one or more color balance parameters for the imaging system and the one or more color balance parameters can include one or more white balance parameters. A method can be used with an imaging system that includes a stereoscopic endoscope. A method can include determining one or more metrics for the imaging system. A metric can indicate whether a predetermined Focus Function focal position difference is exceeded, whether a predetermined Focus Function peak value difference is exceeded, whether a predetermined alignment shift value is exceeded, or whether an illumination level falls below a predetermined illumination level. The target imaged can include calibration features that include multiple localizer features that can be used to determine an orientation for each marker.

In accordance with another embodiment, a method for calibrating an endoscopic imaging system having a field of view is provided. The method involves using a calibration fixture having an interface for constraining engagement with the endoscopic imaging system and a target coupled with the interface so as to be within the field of view and reconfigurable between multiple relative spatial arrangements between the imaging system and the target. The method includes: using the calibration fixture to establish a first relative spatial arrangement between the target and the imaging system; imaging the target with the imaging system from the first relative spatial arrangement, the target including multiple features defining multiple local patterns, the features having known target relative locations; using the calibration fixture to establish a second relative spatial arrangement between the target and the imaging system; imaging the target with the imaging system from the second relative spatial arrangement; processing the images to generate data that includes correspondences between image features and target features by: detecting target features; and locating local patterns by processing the detected features. The processing of the images can include identifying unique correspondences between image features and target features.

For a fuller understanding of the nature and advantages of the present invention, reference should be made to the ensuing detailed description and the accompanying drawings.

Other aspects, objects and advantages of the invention will be apparent from the drawings and the detailed description that follows.

BRIEF DESCRIPTION OF THE DRAWINGS

FIGS. 3A, 3B, 4A, 4B, 5, 6A, 6B, 6C, 7A, and 7B are cross-sectional views of calibration fixtures.

FIG. 20A shows an tissue image.

FIG. 20B shows a version of the image of FIG. 20A that has been blurred using a 4×4 Gaussian kernel.

FIGS. 20C and 20D each show the 2-D fast Fourier transform for the images of FIGS. 20A and 20B, respectively.

FIG. 22A shows the tissue image of FIG. 20A.

FIG. 22B shows a version of the image of FIG. 22A that has been blurred using a 3×3 Gaussian kernel.

FIGS. 22C and 22D each show the 2-D fast Fourier transform for the images of FIGS. 22A and 22B, respectively.

DETAILED DESCRIPTION

In accordance with various aspects and embodiments of the invention described herein, improved methods and assemblies are provided for calibration, alignment, color/white balance adjustment, and diagnostic testing of imaging devices. Such methods and assemblies can be particularly advantageous when used with respect to an endoscopic imaging system prior to use.

Imaging Systems

Although embodiments are described with reference to applications in a minimally invasive surgical system employing an image capturing device in the form of an endoscope, it is to be understood that the field of the invention is not necessarily limited to these applications. For example, embodiments can be used to calibrate imaging devices in general.

Figure 1:
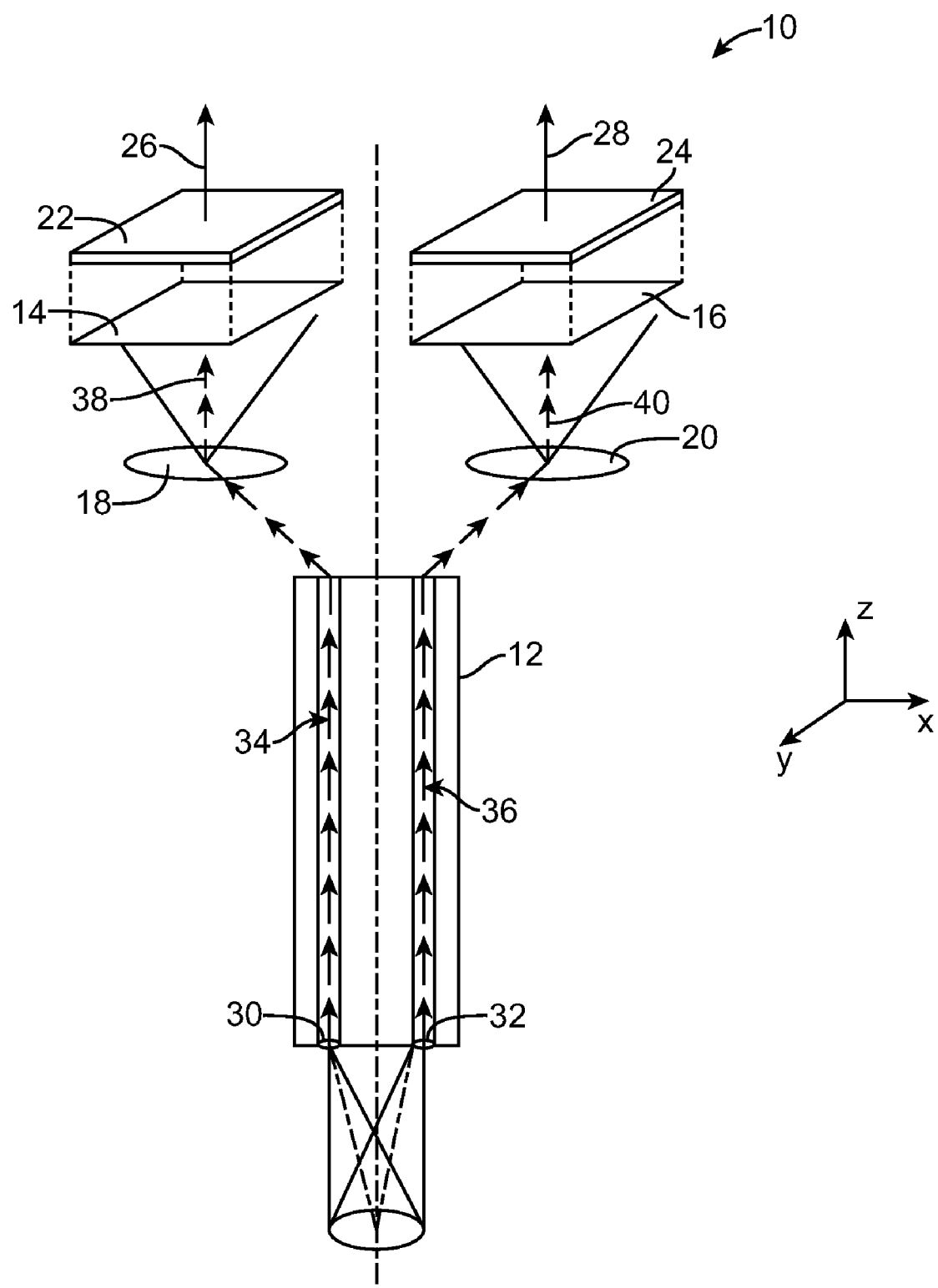
FIG. 1 shows a schematic 3-D view of a stereo imaging system.

Referring to the drawings, and with specific reference to FIG. 1, an imaging system, in accordance with embodiments, is generally indicated by reference numeral 10. System 10 includes a stereo imaging device in the form of a stereo endoscope 12, for example. The system 10 further includes two Charge Coupled Devices (CCDs) 14 and 16, optical lenses 18 and 20, and read means 22, 24 for reading the CCDs and converting information read on the CCDs into a digital format. The read means 22, 24 is typically an appropriate electronically driven system such as a Camera Control Unit (CCU) that transforms optical information read from the CCDs 14, 16 into digital format. The CCD and CCU arrangements can be of the type available from Panasonic® under the part nos.: GP-US522/GP-US532 3CCD color CCU. Accordingly, an electronic processor (not shown) is typically in operative communication with the read means 22, 24 as indicated by lines 26, 28. Optical lenses 30, 32 are disposed at a distal viewing end of endoscope 12. Images are passed through the lenses 30, 32, are passed along optical paths indicated by arrows 34, 36 in endoscope 12, are magnified through lenses 18, 20, and are then projected onto optically sensitive surfaces of the CCDs 14, 16, as indicated by arrows 38, 40. Although imaging system 10 is shown and described, it will be appreciated by one skilled in the art that various alternative imaging systems can alternatively be used.

Calibration Assemblies

Figure 2:
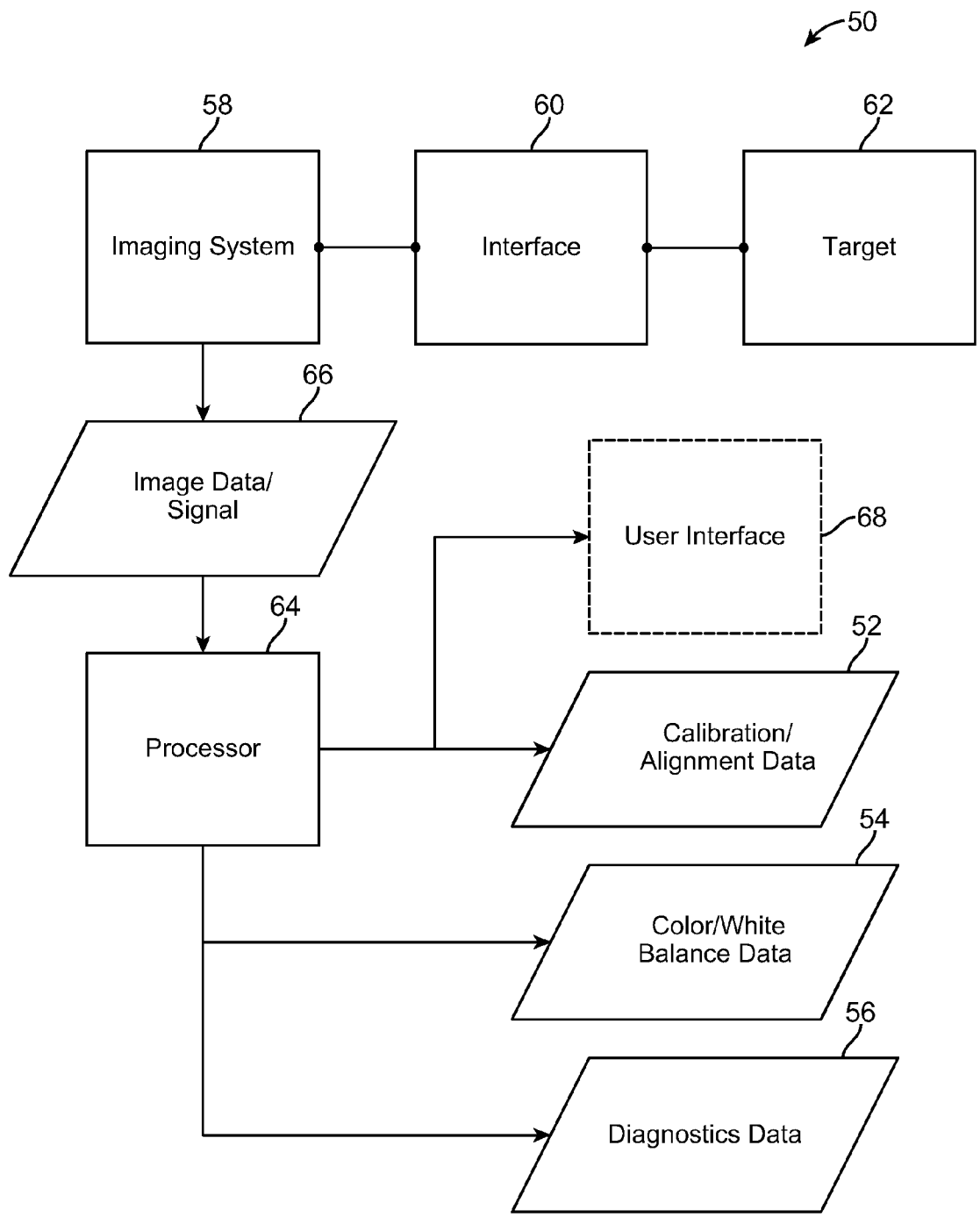
FIG. 2 diagrammatically illustrates a calibration assembly and an imaging system.

FIG. 2 diagrammatically illustrates a calibration assembly 50 that can be used to generate calibration/alignment data 52, color/white balance data 54, and/or diagnostics data 56. Calibration assembly 50 includes an imaging system 58, an interface 60, a target 62, and an electronic data processor 64. Imaging system 58 can include any number of devices, such as a stereo endoscope, that can be used to capture an image and output image data or an image signal in response thereto. Interface 60 provides a means by which to constrain the imaging system 58 relative to the target 62. Interface 60 can include, for example, a lock or other mechanical constraint to prevent relative motion between the imaging system and the interface. Interface 60 can be coupled with target 62 so that the target is posed (positioned and oriented) relative to the constrained imaging system 58 so that the target is within the field of view of the imaging system. In some embodiments that will be described in more detail below, the interface 60 and target 62 are coupled so as to form a calibration fixture. Processor 64 is coupled with imaging system 58 so as to receive the image data/signal 66. Processor 64 uses the image data/signal 66 to generate calibration/alignment data 52, color/white balance data 54, and/or diagnostic data 56. Calibration/alignment data 52 can include unique correspondences between extracted image features and features of target 62.

Calibration assembly 50 can include additional optional components. For example, the interface 60 and the target 62 can be coupled by way of a motorized mechanism. The motorized mechanism can be driven so as to be synchronized with the capture of images, such as by rotating the target relative to the interface between image captures and stopping during an image capture. The motorized mechanism can also be synchronized with the focus of the imaging system 58. It has been observed that camera calibration parameters can differ when the focus is changed. As such, an imaging system may need to be calibrated at multiple focus settings. In this circumstance, even more images will need to be taken and a motorized mechanism may be of even greater benefit in reducing the workload on a human operator. Interpolation can be used to determine calibration parameters in between the calibrated focuses.

Calibration assembly 50 can include an optional user interface 68. User interface 68 can be used to guide a human operator during the image capture process. The user interface can include a communication device, such as a display or speaker, that can be used to guide the operator to position the target relative to the imaging system. For example, user interface 68 can be used to guide the operator to rotate the target relative to the imaging device by a certain angle, such as by showing the current orientation and the desired orientation. The user interface 68 can inform the operator to keep the image device fixed relative to the target during image capture so that no motion blur occurs, which can be especially important during modular transfer function (MTF) estimation where motion blur may not be discernible from the blur due to the optical system.

Calibration Fixtures

FIG. 3A is a cross-sectional view of a calibration fixture 70 that can be used to provide constraining engagement with an imaging device, such as a zero-degree endoscope 72, in accordance with an embodiment. Calibration fixture 70 includes a receptacle 74 shaped to interface with an imaging device. Although receptacle 74 can be cylindrical, other non-cylindrical configurations can be used. Calibration fixture 70 includes a target surface 76 on which target features are located. Target surface 76 can directly incorporate the target features, or a target containing target features can be mounted on target surface 76. Target surface 76 shown is a single planar surface, but can be any number of planar or non-planar surfaces. Calibration fixture 70 is configured so that the target features are posed relative to one or more fields of view 78, 80 of an endoscope when the endoscope is constrained by the calibration fixture 70. The target surface 76 can be oriented relative to the as-constrained viewing direction of the endoscope so that a target surface normal direction 82 is at an angle 84 with the as constrained viewing direction 86.

Calibration fixture 70 is configured so that target surface 76 can be imaged from multiple imaging directions. In use, an endoscope is inserted into the receptacle 74, which can be configured so as to constrain the endoscope while allowing the endoscope to rotate relative to the receptacle 74. One or more images of the target features can thereby be taken at one or more relative angular orientations between the endoscope and the target surface 76.

When calibration fixture 70 is used with a zero-degree endoscope 72, rotating the endoscope relative to the receptacle 74 does not change the basic alignment between the field of views 78, 80 and the receptacle 74. However, as shown in FIG. 3B, when the calibration fixture 70 is used with an angled endoscope, such as thirty-degree endoscope 88 shown, rotating the endoscope relative to the receptacle 74 does change the basic alignment between the field of views 78, 80 and the receptacle 74, which may result in different portions of target surface 76 being within the fields of view for any particular relative rotation. Although such partial target imaging may not be optimal, it may still provide sufficient image data for the generation of calibration/alignment data, color balance data, and/or diagnostics data.

FIG. 4A is a cross-sectional view of a calibration fixture 90 that can be used with a thirty-degree endoscope 92, in accordance with another embodiment. Calibration fixture 90 can include an interface 94 shaped to interface with thirty-degree endoscope 92 so as to constrain the thirty-degree endoscope 92 in one or more poses (position and orientation) relative to the target 96. For example, the interface can be a basically cone-shaped receptacle that can be configured to provide a thirty-degree endoscope 92 with a more balanced view of the target as compared to calibration fixture 70 of FIG. 3B. For example, the interface 94 can be configured to align the fields of view 98, 100 along a reference direction 102. Various configurations for the interface 94 can be used so as to constrain the thirty-degree endoscope 92 in one or more poses relative to the target so that the endoscope can capture one or more images that can be processed to generate calibration/alignment data, color/white balance data, and/or diagnostics data.

FIG. 4B is a cross-sectional view of a calibration fixture 110 that can be used to with either a zero-degree endoscope 112 or a thirty degree endoscope 114. Calibration fixture 110 combines aspects of the calibration fixture 70 of FIG. 3A and the calibration fixture 90 of FIG. 4A. Calibration fixture 110 includes an upper interface part 116 that is coupled with a lower part 118 by way of a coupling element 120. However, the basic functionality of calibration fixture 110 can be provide in a variety of ways. For example, calibration fixture 110 can be configured as an integral unit having multiple integrally formed receptacles, or calibration fixture 110 can be fabricated from a number of subassemblies.

Figure 5:
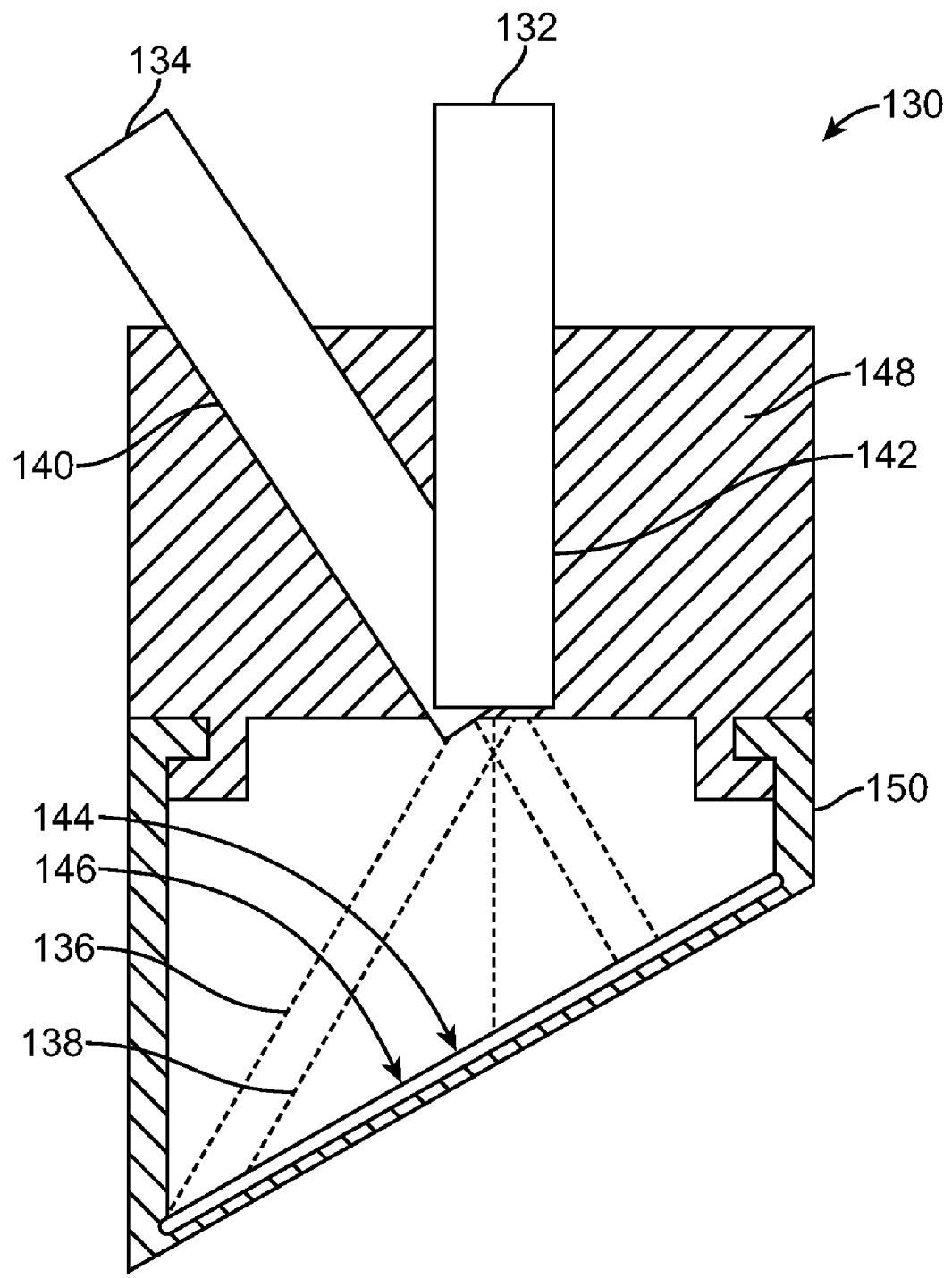

FIG. 5 is a cross-sectional view of a calibration fixture 130 that can be used to provide constraining engagement with an endoscope, in accordance with another embodiment. Calibration fixture 130 is configured for use with either a zero degree endoscope 132 or a thirty-degree endoscope 134. With the zero-degree endoscope 132, fields of view 136, 138 are aligned with the zero-degree endoscope 132. With the thirty-degree endoscope 134, fields of view 136, 138 are misaligned with the thirty-degree endoscope 134 by approximately thirty degrees. Accordingly, calibration fixture 130 includes a thirty-degree endoscope receptacle 140 and a zero-degree endoscope receptacle 142, either of which can be used as appropriate for the endoscope being used to capture images of target 144 disposed on target surface 146. The thirty-degree endoscope receptacle 140 can include features that can be used to place the thirty-degree endoscope 134 in an angular orientation so that the fields of view 136, 138 are directed towards the target 144. For example, the thirty-degree endoscope receptacle 140 and the thirty-degree endoscope 134 can include reference markings (not shown) that can be aligned, or can include complementary mating features (not shown) that produce the alignment. However, exact alignment is not critical. Calibration fixture 130 includes an upper portion 148 and a lower portion 150. The lower portion 150 and the upper portion 148 are coupled for relative rotation.

Calibration fixture 130 is configured so that target 144 can be imaged from multiple imaging directions. When used with a zero-degree endoscope 132, the zero-degree endoscope 132 can be rotated relative to the zero-degree endoscope receptacle 142, or the lower portion 150 can be rotated relative to the upper portion 148. When used with a thirty-degree endoscope 134, the lower portion 150 can be rotated relative to the upper portion 148. A lock can be provided to prevent relative motion between the endoscope and the receptacle, which may be more convenient for single hand operation.

FIGS. 6A, 6B, and 6C are cross-sectional views of an articulated calibration fixture 160. Calibration fixture 160 can be used with either a zero-degree endoscope 162, or a thirty-degree endoscope 164. Calibration fixture 160 includes an upper portion 166 having a zero-degree endoscope receptacle 168 and a thirty-degree endoscope receptacle 170. Fixture 160 is configured so that the angle between the viewing direction 172 and the target 174 is varied as the target 174 is being rotated relative to the upper portion 166. The ability to control the slant angle of the target 174 relative to the viewing direction 172 may be advantageous where different slant angles are desired. Fixture 160 includes a lower portion 176 that is coupled with the upper portion 166 so as to allow relative rotation about the viewing direction 172. The lower portion 176 includes an articulated target 174 that is coupled with the lower portion at a pivot point 178. The slant angle of the target plane is controlled by a first rod 180 and a second rod 182, which interface with a cam surface 184 of the upper portion 166 so as to provide varying slant angles in response to relative rotation between the upper portion 166 and the lower portion 176.

FIG. 6A illustrates the relative positions of the upper portion 166, the lower portion 176, and the target 174 when the upper portion 166 is at a zero-degree reference position relative to the lower portion 176. At the zero-degree reference position, the first rod 180 has been displaced downward through contact with the cam surface 184, and the second rod 182 has been displaced upwards as provided for by the cam surface 184. The positions of the first rod 180 and the second rod 182 result in the target slant angle shown.

FIG. 6B illustrates the relative positions of the upper portion 166, the lower portion 176, and the target 174 when the upper portion 166 is at a 90-degree reference position relative to the lower portion 176 (i.e., the upper portion 166 has been rotated 90 degrees from its position of FIG. 6A). At the 90-degree reference position, the first rod 180 and the second rod 182 share equal vertical locations as provide for by the cam surface 184, which results in a horizontal target 174.

FIG. 6C illustrates the relative positions of the upper portion 166, the lower portion 176, and the target 174 when the upper portion 166 is at a 180-degree reference position relative to the lower portion 176 (i.e., the upper portion 166 has been rotated 180 degrees from its position of FIG. 6A). At the 180-degree reference position, the second rod 182 has been displaced downward through contact with the cam surface 184, and the first rod 180 has been displaced upwards as provided for by the cam surface 184. The positions of the first rod 180 and the second rod 184 result in the target slant angle shown.

Figure 7B:
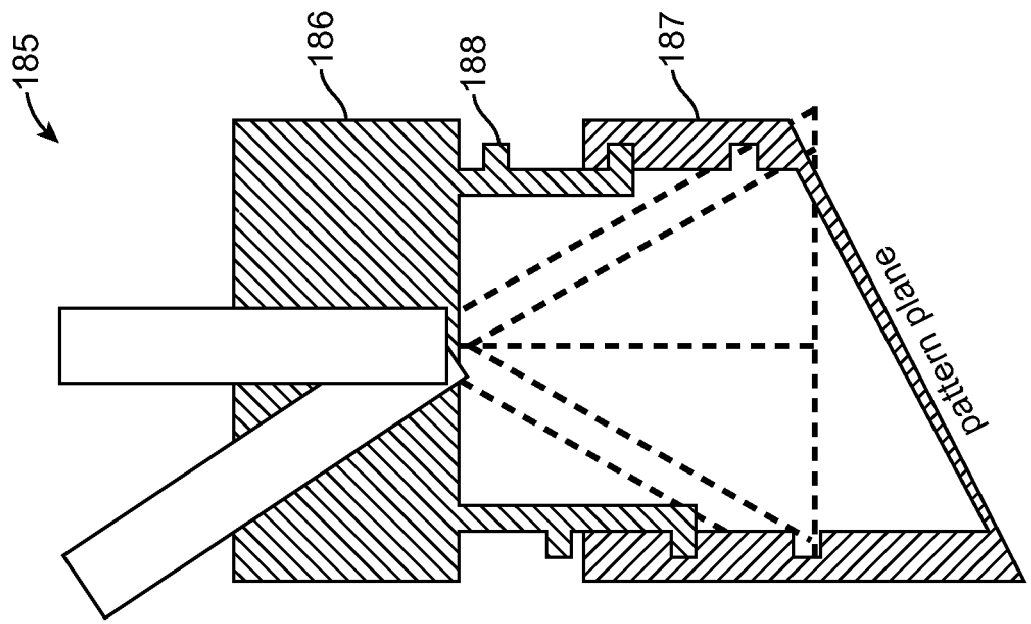
Figure 7A:
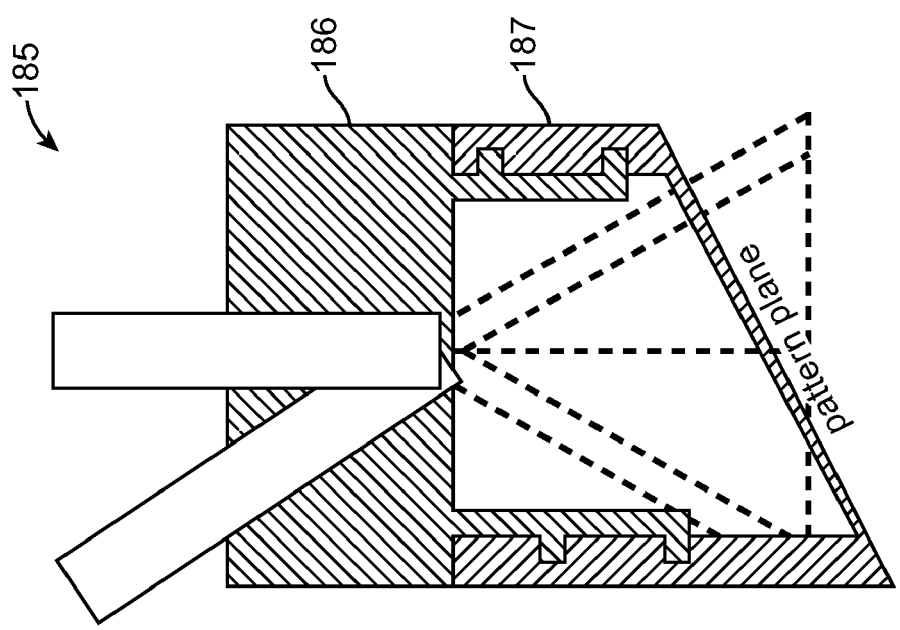

FIGS. 7A, and 7B are cross-sectional views of another articulated calibration fixture 185. Calibration fixture 185 is configured to change the distance between an endoscope and the target in response to rotation between upper portion 186 and lower portion 187. This change in distance can be provided by a screw mechanism 188 that couples upper portion 186 with lower portion 187. Calibration fixture 185 provides the ability to gather calibration data for an increased range of viewing distances. This potentially makes the estimated camera parameters accurate for an increased range of distances.

The advantages of using a calibration fixture are summarized here. The fixture constrains target motion from six degrees of freedom (3-D rigid transformation; three for translation and three for rotation) to 1 degree of freedom rotation. This makes control of the target much more straightforward. The constrained motion can also guarantee that sufficient data is obtained for a successful camera calibration by following simple procedures (for example, by rotating the fixture by 360 degrees). Obtaining sufficient data involves both the orientation variation of the target and the coverage and balance of calibration features in images. The use of a calibration fixture minimizes dependence upon the user and maximizes the repeatability of the calibration process. This is especially important with surgical assistants who may know little about camera calibration. As an additional advantage, because the imaging device is interfaced with the fixture through a receptacle, the geometric relationship between the housing of the imaging device (for example, the outer cylindrical surface of an endoscope) and the imager can be partially recovered (only for rotation). This geometric relationship can be useful in image guided intervention using a robotically controlled camera arm.

Target Designs

A variety of different target designs can be used with aspects of the calibration assemblies described herein, such as with calibration assembly 50 of FIG. 2. Possible target designs include an existing "checkerboard" pattern, which, as discussed above, typically requires some manual designation of the pattern in the image. Preferably, a target design incorporates a self-referential pattern of target features so that the image can be automatically processed without the need for any manual designation. More preferably still, the target design incorporates multiple discrete self-referential patterns (i.e., markers). A self-referential pattern can include, for example, localizer features and identification features. Localizer features provide positional or orientation information to determine pose/alignment of the marker and the identification features can be used to differentiate between different markers. Such multiple self-referential patterns can advantageously provide for more robust calibration image processing by being more tolerant of partial occlusions and/or image misalignments.

The use of multiple self-referential markers provides a number of advantages. One advantage is that portions of the image containing different markers can be separately processed, which can add a level of robustness to the processing of the overall image by allowing the collection of at least some useable data where portions of the target are not imaged or portions of the image cannot processed for some reason. Another advantage is that the target pattern may allow for the use of a less complex calibration fixture, especially with respect to calibration of a thirty-degree endoscope that may image different portions of the target depending on its relative orientation to the calibration fixture (e.g., see FIG. 3B and related discussion). Another advantage is that a marker can be configured to occupy a small area, which are less affected by non-linear distortion as compared to a larger pattern.

Figure 8:
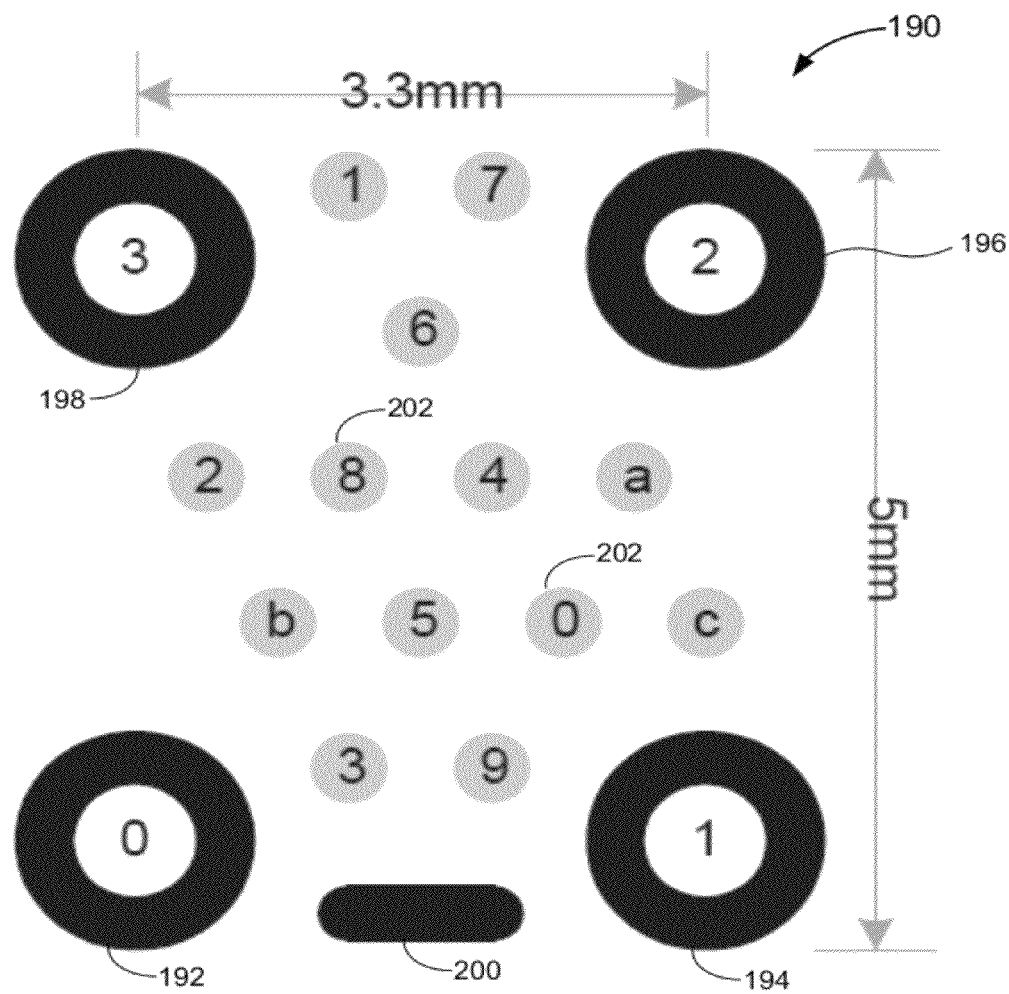
FIG. 8 diagrammatically illustrates a 2-D marker having localizer features and identification features.

FIG. 8 diagrammatically illustrates a 2-D self-referential marker 190 having localizer features and identification features, in accordance with an embodiment. The localizer features include four dark circles 192, 194, 196, 198 and a dark bar 200. The numbers within the circles are illustrative of position designations. The localizer features of a particular marker can be automatically associated with resulting image features, which allows for the association of the know target relative coordinates of the localizer features with their image coordinates.

The identification features of marker 190 include thirteen dots 202 (i.e., bits). The presence or absence of a dot at a particular location in the designated pattern is a binary indicator (e.g., if the dot exists is signifies a binary "1" for the value associated with that dot's position, and if the dot does not exist it signifies a binary "0" for the value associated with that dot's position). Accordingly, in the illustrative FIG. 8 example, the values shown ("0" through "9" and "a" through "c") are illustrative of position designations for one or more binary numbers. The thirteen dots 202 can be segregated, with some dots being used for identification data and some dots being used for error checking data. The presence or absence of the dots used for identification data can be used to designate a number of unique codes (or identifications). The presence or absence of dots used for error checking data can be used to validate a code or identification determination. In one presently preferred approach, the thirteen dots are segregated into six dots used to carry identification information (resulting in 64 unique codes), with the remaining seven dots used for error checking. Among the seven error checking dots, six can be set to be the inverse of the identification dots, and the remaining dot can be used as checksum data. The rationale for this approach is to always ensure that there are six or seven dots that are physically present in a pattern (i.e., they are set to one). This avoids an all zero (all blank) pattern as a valid code and provides alternative features that can be used to provide positional information if required. The specific identification feature pattern illustrated (e.g., number and position of dots), along with the illustrated manner in which identification feature information is coded (e.g., the use of dots), is an example of many possible identification features (see e.g., other exemplary patterns described below). For more information regarding self-referential markers, see the commonly owned U.S. Pat. App. No. 61/202,084 (filed Dec. 31, 2008), which is incorporated herein by reference.

Figure 9A:
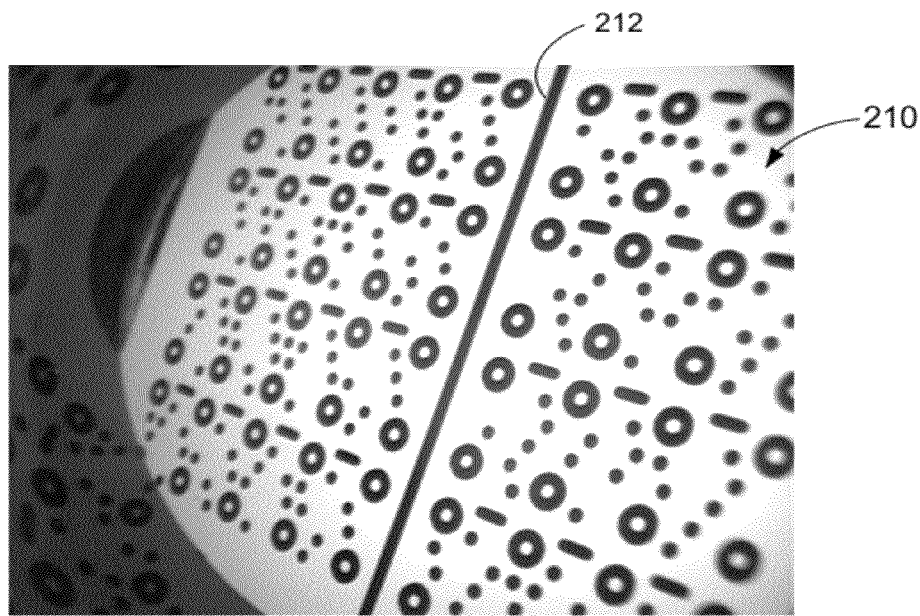
FIGS. 9A and 9B show respective images from two different viewing directions of a calibration target having multiple 2-D markers and a slanted-edge modulation transfer function (MTF) feature.
Figure 9B:
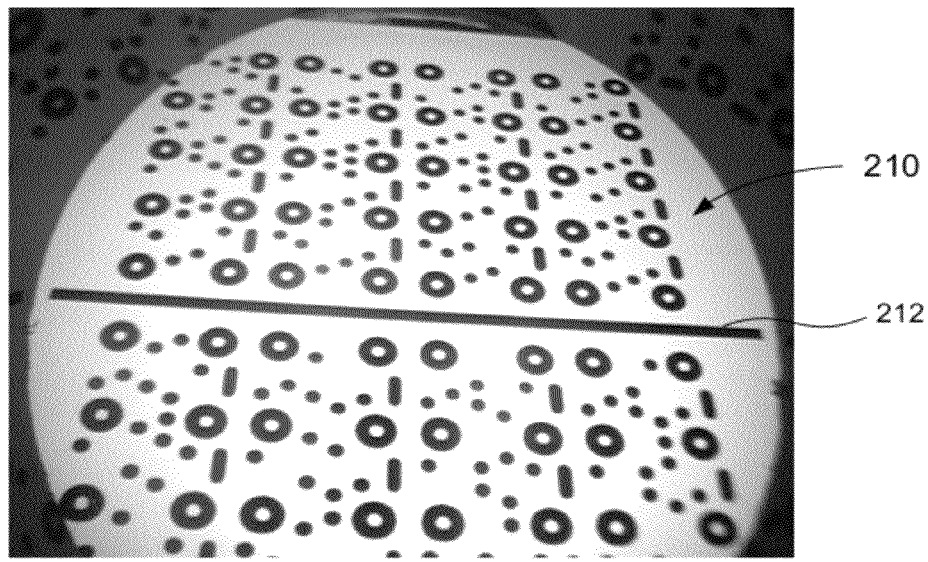

A target can include multiple self-referential markers. FIGS. 9A and 9B are two different images of a target 210 containing multiple self-referential markers, in accordance with an embodiment. The images were obtained using a prototype calibration fixture in accordance with FIG. 3A. The imaged target 210 includes two groups of sixteen markers, with the groups separated by a straight dark bar 212 that can be used as a slanted-edge MTF feature. The markers and the dark bar 212 are set against a white background that can be used for the determination of a color/white balance adjustment for the imaging system. A portion of an image of a particular marker can be separately processed (i) so as to determine image coordinates for one or more of the localizer features of the marker, and (ii) to determine the identification of the marker so that the target relative coordinates of the marker localizer features can be associated with their image coordinates for use in determining calibration/alignment data for the imaging system. As discussed above, the positions of the marker dots in the images can also be used to formulate coordinate information for use in the generation of calibration/alignment data. It can be seen from FIGS. 9A and 9B, for example, that each of the markers has a different set of dots showing in the pre-designated pattern. It can also be seen that some of the markers share localizer features, with some circles being used as a localizer feature for two markers.

Image Processing

Figure 10:
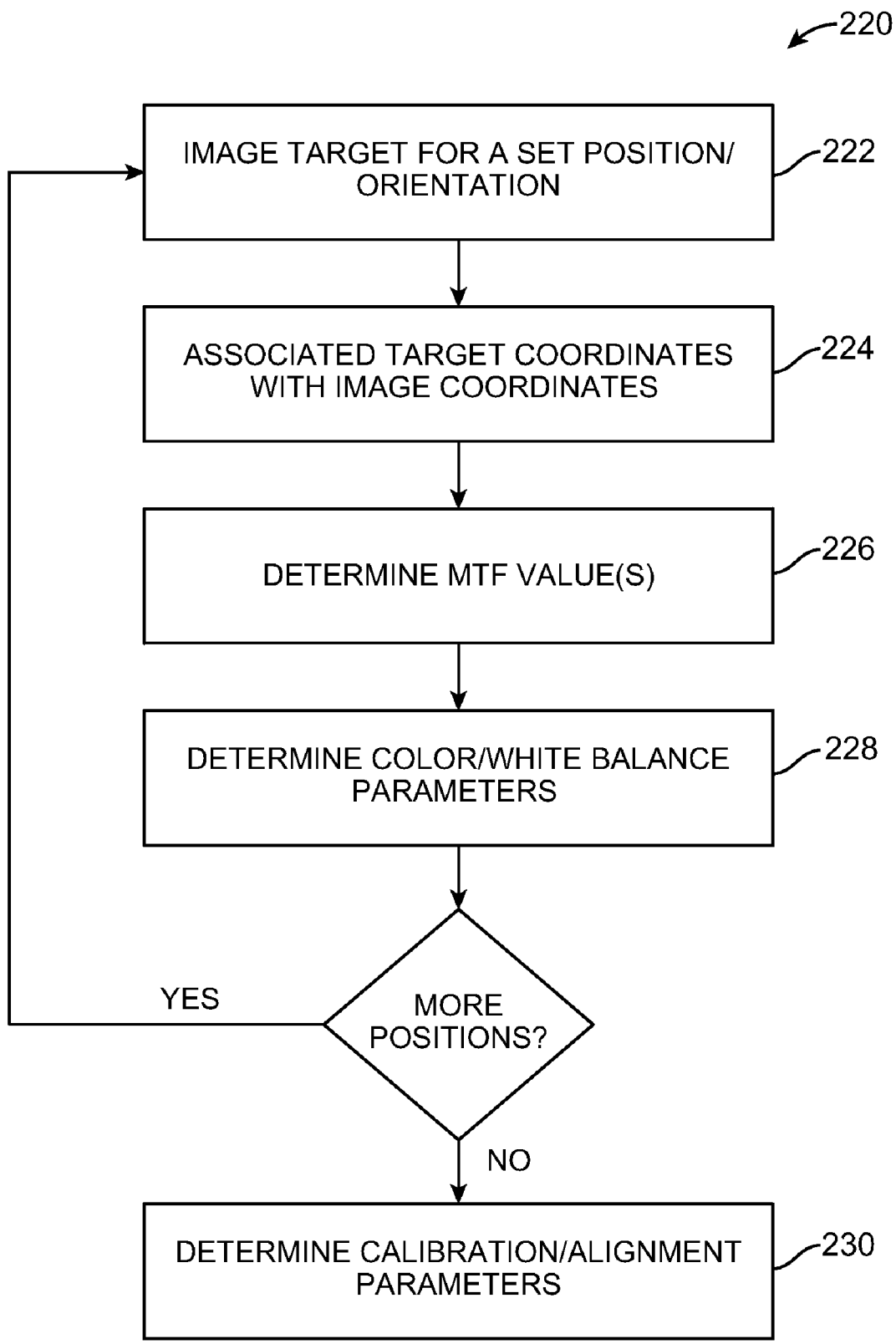
FIG. 10 is a flow diagram for a method for determining MTF value(s), color/white balance parameters, calibration parameters, and alignment parameters.

FIG. 10 is a flow diagram for a method 220 for determining MTF value(s), color/white balance parameters, and calibration/alignment parameters. In step 222, an image of a target for a set position/orientation is captured by using an imaging device. The imaged target contains features with known target relative coordinates. Step 222 can be accomplished using a calibration fixture, such as one of the above described calibration fixtures. In step 224, the captured image (i.e., image data and/or signal) is processed so as to determine image coordinates for the target features. The image coordinates are associated with the known target relative coordinates by associating target features with image features. The association of target features with image features can be accomplished in a variety of ways, such as by using one of the above described target patterns, preferably a self-referential target pattern. The target relative coordinates and associated image coordinates for the particular captured image can be combined with any possible additional target images at additional positions/orientations for use in determining calibration/alignment parameters.

In step 226, the captured image can be processed to determine one or more MTF values. MTF provides a measure of the imaging system's resolution and can be used for diagnostic purposes. By comparing a measured MTF value with a standard MTF value (i.e., an acceptable MTF value for the imaging system in question), a measure of the functionality of the imaging system can be obtained. Where insufficient resolution functionality is indicated, a status and/or failure message can be generated to communicate that the imaging system has degraded resolution.

An MTF value can be determined by a variety of ways known in the art. The ISO 12233 spatial frequency response evaluation method is one such approach, and it is based on an edge-gradient method. (For further discussion, see e.g., Peter D. Burns, "Slanted-Edge MTF for Digital Camera and Scanner Analysis," In *Proc. IS&T 2000 PICS Conference*, pg. 135-138, 2000.) An edge-gradient method involves the imaging of an edge feature and processing the image of the edge feature. A key step processing the image of the edge feature is the determination of the location and direction of the edge feature, because this act has a direct effect on the computed spatial frequency response (SFR). Advantageously, the known location and orientation of the slanted-edge MTF feature 212 in the above described target patterns of FIGS. 9A and 9B relative to the self-referential markers can be used in this determination.

MTF values can be computed for a variety of directions and a variety of positions for each captured image. As such, a collection of MTF values can be computed so as to provide sufficient data regarding the health of the imaging system.

In step 228, the captured image can be processed to determine color/white balance parameters. As will be discussed in more detail below, the target patterns of FIGS. 9A and 9B advantageously include a white background, which enables the determination of white balance parameters.

If one or more additional images of the target are required for one or more additional set positions/orientations, steps 222, 224, 226, and 228 can be repeated. Steps 222, 224, 226, and 228 can be individually included or omitted as required. For example, it may not be necessary to repeat step 228 for additional positions where the white balance parameters were sufficiently determined by using a previous position/orientation.

In step 230, the resulting collection of associated target coordinates and image coordinate can be used to determine calibration/alignment parameters. In the case of a stereoscopic imaging device, calibration parameters for the two imaging paths can be use to determine alignment parameters. To determine alignment parameters, a virtual 3-D point can be placed in the middle of the camera view volumes with its depth being at a desired distance. The 3-D point is then projected into image points by the camera models for the left and right eyes. The difference between the two image points in the image coordinates are the alignment parameters. If necessary (e.g., due to optical assembly inaccuracy, difference in left and right eye optics), the rotation, scale, and perspective effect can also be compensated for to make for a better viewing experience from the stereo viewer, if the camera parameters are known.

Figure 11:
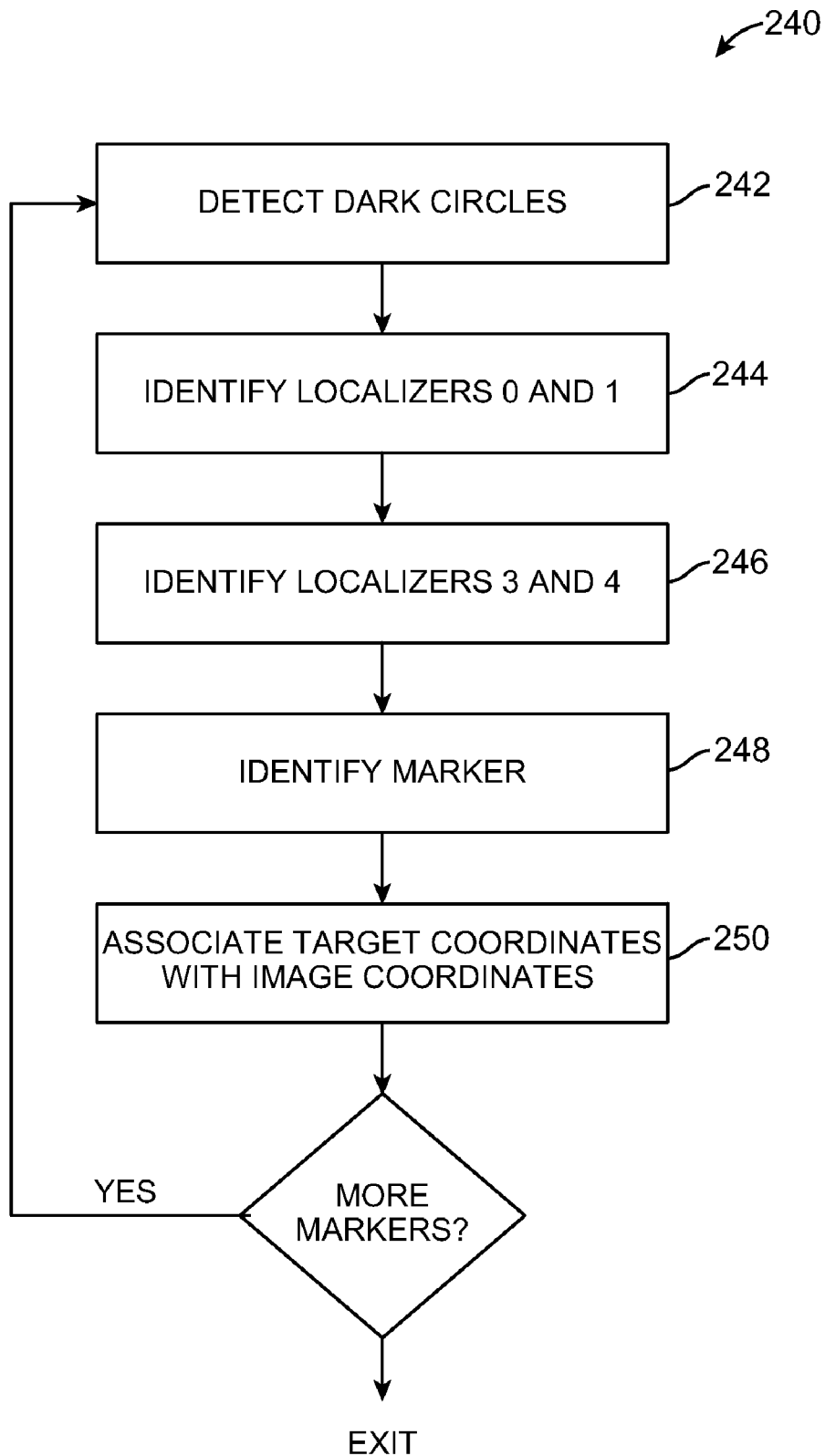
FIG. 11 is a flow diagram for a method for associating target 2-D marker coordinates with associated image coordinates.

FIG. 11 is a flow diagram for a method 240 for processing an image that includes two-dimensional self-referential markers of FIGS. 8, 9A, and 9B so as to associate target coordinates with image coordinates. In general, the processing of images of such markers can use the systems and methods described in commonly owned U.S. Pat. App. No. 61/202, 084 (filed Dec. 31, 2008), which was incorporated by reference above. In step 242, an image is processed to detect dark circle localizer features. In step 244, localizers 0 and 1 are identified by searching for two dark circles (designated in FIG. 8 as "0" and "1") within a minimum and maximum distance and that have a bar (e.g., bar 200) generally between them that is aligned with a line connecting the two circles. By identifying the side of the line that the bar is on, a partial orientation of the pattern can be determined (i.e., about a line in the image). In step 246, localizers 3 and 4 are identified by searching for two dark circles (designated in FIG. 8 as "3" and "4") within a search area relative to the identified localizers 0 and 1. When a calibration fixture is used that constrains the target imaging direction to a predetermined direction for any particular angular position of the target (i.e., calibration fixtures as in FIGS. 3A, 4A, 4B, 5, 6A, 6B, 6C, 7A, and 7B), the expected locations for localizers 3 and 4 can be substantially predetermined based on the orientation of the marker as determined by localizers 0 and 1 and their associated bar. In step 248, the marker can be identified by reading the identification dots. Where the identification dots are used for error checking data, the error checking data can be used to validate the identification of the marker. In step 250, the image coordinates for marker features, such as the image coordinates for the dark circle localizer features are associated with their corresponding target relative coordinates.

Method 240 can include some optional steps. For example, Random Sample Consensus (RANSAC) can be used for outlier rejection. By estimating a global alignment transformation for each marker, one can detect the outliers using RANSAC. (For details of RANSAC, see M. A. Fischler and R. C. Bolles, "Random sample Consensus: A paradigm for model fitting with applications to image analysis and automated cartography," Comm. of the ACM, 24: pages 381-395, 1981, which is hereby incorporated by reference.) Additionally, the features of partially visible markers can be used. The features (circles and dots) of partially visible markers are usually in the periphery of an image so that they may contribute more to the estimation of the distortion model than features in the middle of the image. By using a first iteration of calibration parameters, the image locations of the features which are not used in the first iteration are known. A conservative strategy (small distance threshold) can be used to collect such features from the images. All the features can therefore be used for a second calibration iteration.

Figure 12A:
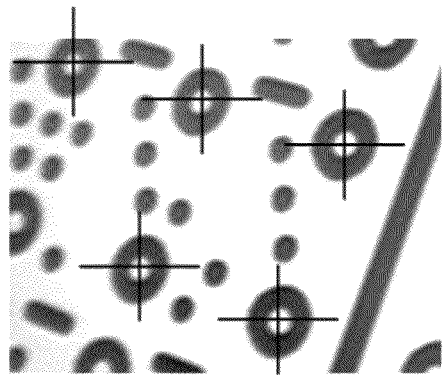
FIGS. 12A through 12E illustrate steps for processing an image so as to identify a calibration target marker.
Figure 12B:
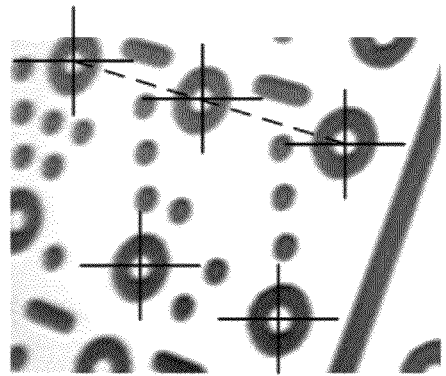
Figure 12C:
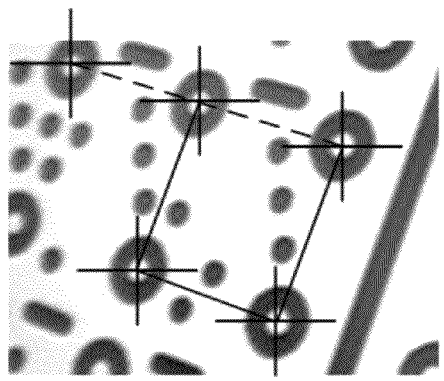
Figure 12D:
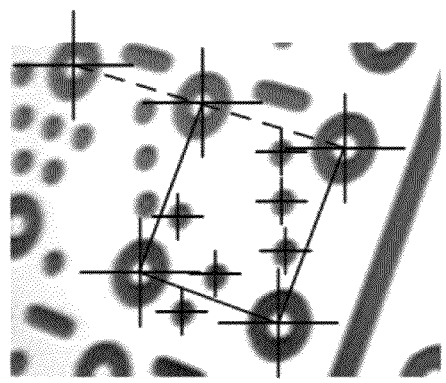
Figure 12E:
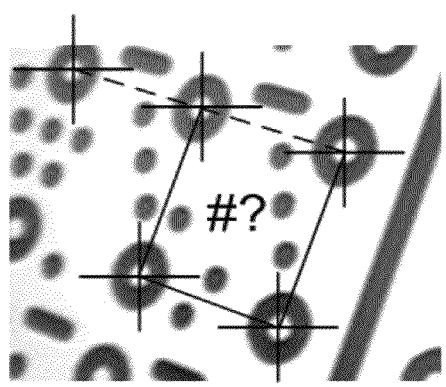

FIGS. 12A, 12B, 12C, 12D, and 12E illustrate the method of FIG. 11 for a single marker. In FIGS. 12A and 12B, the dark circles are detected and localizers 0 and 1 are identified. In FIG. 12C, localizers 3 and 4 are identified. In FIG. 12D a marker identification hypothesis is tested by checking to see whether the image contains identification dots at expected locations. If the marker identification hypothesis is correct, the marker is identified as illustrated in FIG. 12E. The image can also be processed so as to directly detect the presence or absence of identification dots, which can be used to directly determine the identification of the marker.

Figure 13A:
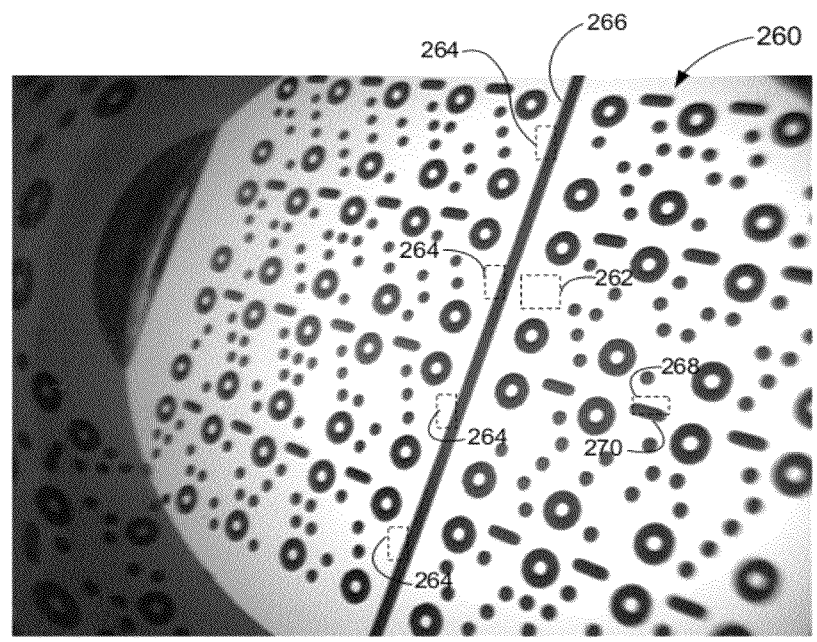
FIG. 13A, illustrates exemplary locations within an image of a calibration target of regions of interest that can be processed to determine color/white-balance parameters and MTF values.

FIG. 13A illustrates the location within an image of a calibration target 260 of an exemplary color/white-balance region of interest 262 that can be processed to determine color/white-balance parameters. With a determination of the orientation and position of the target within a captured image, a color/white-balance region of interest 262 can be selected so as to encompass a sufficient amount of the white background of the target for use in determining color balance parameters, such as white balance parameters. As can be appreciated with reference to FIG. 13A, multiple potential regions of interest exist that can be selected for processing to determine color balance parameters. Another approach is to extract the dark patterns and use the resulting image, which contains only white areas, to determine the color balance parameters (e.g., white balance parameters).

Figure 13B:
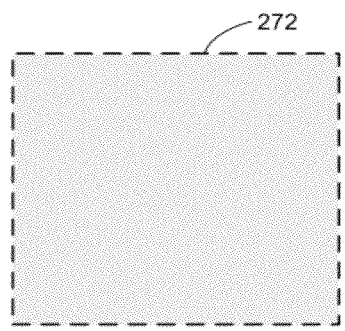
FIGS. 13B and 13C illustrate a non-color balanced region-of interest of the image of FIG. 13A and a color balance control.
Figure 13C:
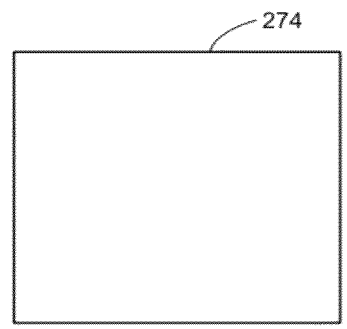

FIG. 13A also illustrates locations of exemplary MTF regions of interest that can be processed to determine MTF values. One or more of the slanted-edge MTF regions of interest 264 disposed anywhere along slanted-edge feature 266 can be processed to determine MTF values, which can provide diagnostic data for an imaging device at any selected point along the slanted-edge feature 266. A marker bar MTF region of interest 268 can also be disposed on a marker bar 270. Accordingly, a combination of MTF regions-of interest can be selected so as to provide diagnostic data for multiple specific locations throughout an image. Additionally, multiple images can be processed where the slanted-edge feature 266 and marker bars 270 have a different orientation in the image, thereby providing additional image relative locations at which to calculate MTF values. FIGS. 13B and 13C illustrate a color/white balanced region-of interest 272 of the image of FIG. 13A and a color/white-balance control 274, respectively. Region-of interest 272, for example, can be any number of regions-of interest that captures a background region of the target, such as region-of interest 262 shown in FIG. 13A, which can be selected based upon the target's position and orientation as determined by processing one or more of the marker patterns. The region-of interest 272 can be processed against the control 274 so as to determine color/white balance parameters. Alternatively, the dark areas can be extracted and the resulting image containing only white areas can be processed against the control 274 so as to determine color/white balance parameters.

Target design variations can be used to provide slanted-edge features at additional orientations that can be used to determine MTF values. Such additional slanted-edge features may reduce the number of images required to generate MTF values for vertical and horizontal image device directions. When determining MTF values for the vertical direction, it can be advantageous to image slanted-edge features that are slanted by a relatively small angle (e.g., by 10 degrees) from the horizontal direction. Likewise, when determining MTF values for the horizontal direction, it can be advantageous to image slanted-edge features that are slanted by a relatively small angle (e.g., by 10 degrees) from the vertical direction. In one such target design variation, the bar 200 (shown in FIG. 8) can be replaced by a wedge shape having a small angle (e.g., 7 degrees), thereby providing two slanted-edge orientations per bar instead of one. Some, groups, or all of the bars on a target can also be oriented differently, thereby providing additional orientations for any particular camera to target orientation. The shape of the straight dark bar 212 (shown in FIGS. 9A and 9B) can also be modified to provide additional slanted-edge orientations. The straight dark bar can also be augmented with multiple instances disposed at additional orientations (e.g. one vertical and one horizontal).

Additional Target Designs and Methods

Figure 14A:
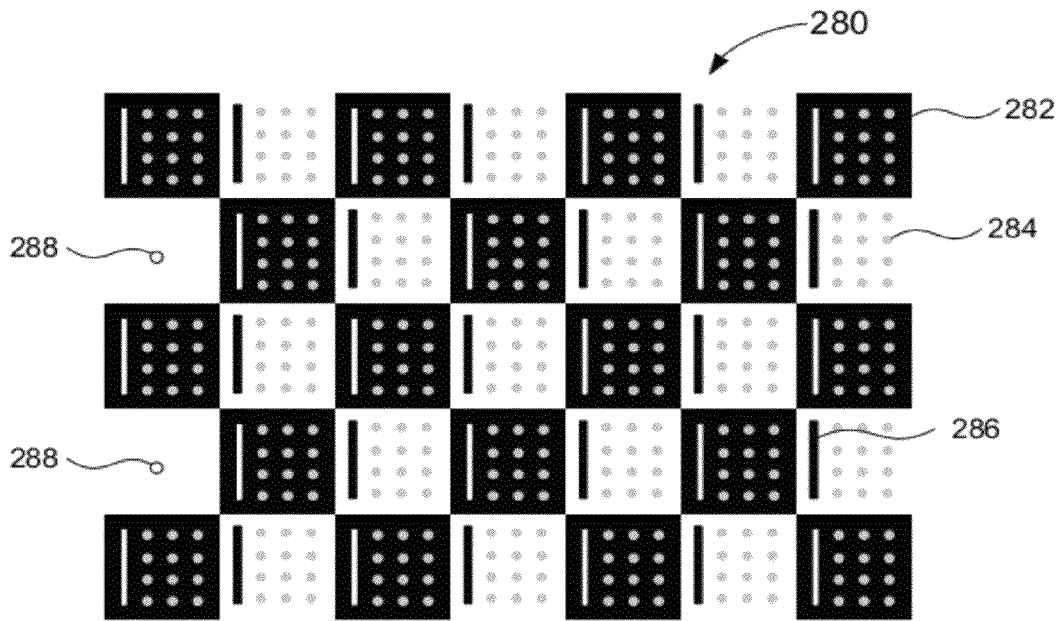
FIGS. 14A and 14B illustrate calibration targets.
Figure 14B:
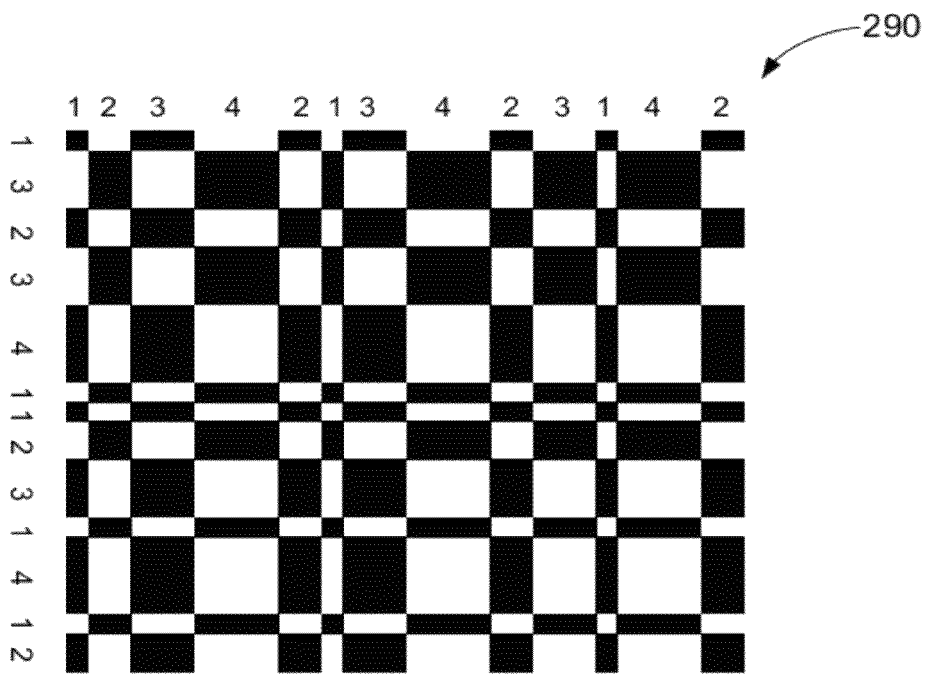

FIGS. 14A and 14B illustrate additional calibration targets. Calibration target 280 is similar in concept to calibration target 210 (shown in FIGS. 9A and 9B). Calibration target 280 uses a mixture of corners 282, dots 284, bars 286, and white balance control areas 288. Corners 282 and bars 286 can be used as localizer features. Dots 284 can be used for identification and error-checking/correction data. A detection algorithm similar to method 240 (shown in FIG. 11) can be used to process an image of calibration target 280.

Calibration target 290 provides another approach. Calibration target 290 is an example of a pattern that has unique local regions (i.e., a windowed view of the whole pattern exhibits some uniqueness compared to other windowed views). Calibration target 290 is a modified version of the commonly used checker-board pattern. The various feature dimensions (e.g., 1, 2, 3, 4) indicate values. White regions can be used for white balance areas. Edges can be used for MTF calculations, as described above.

Figure 15:
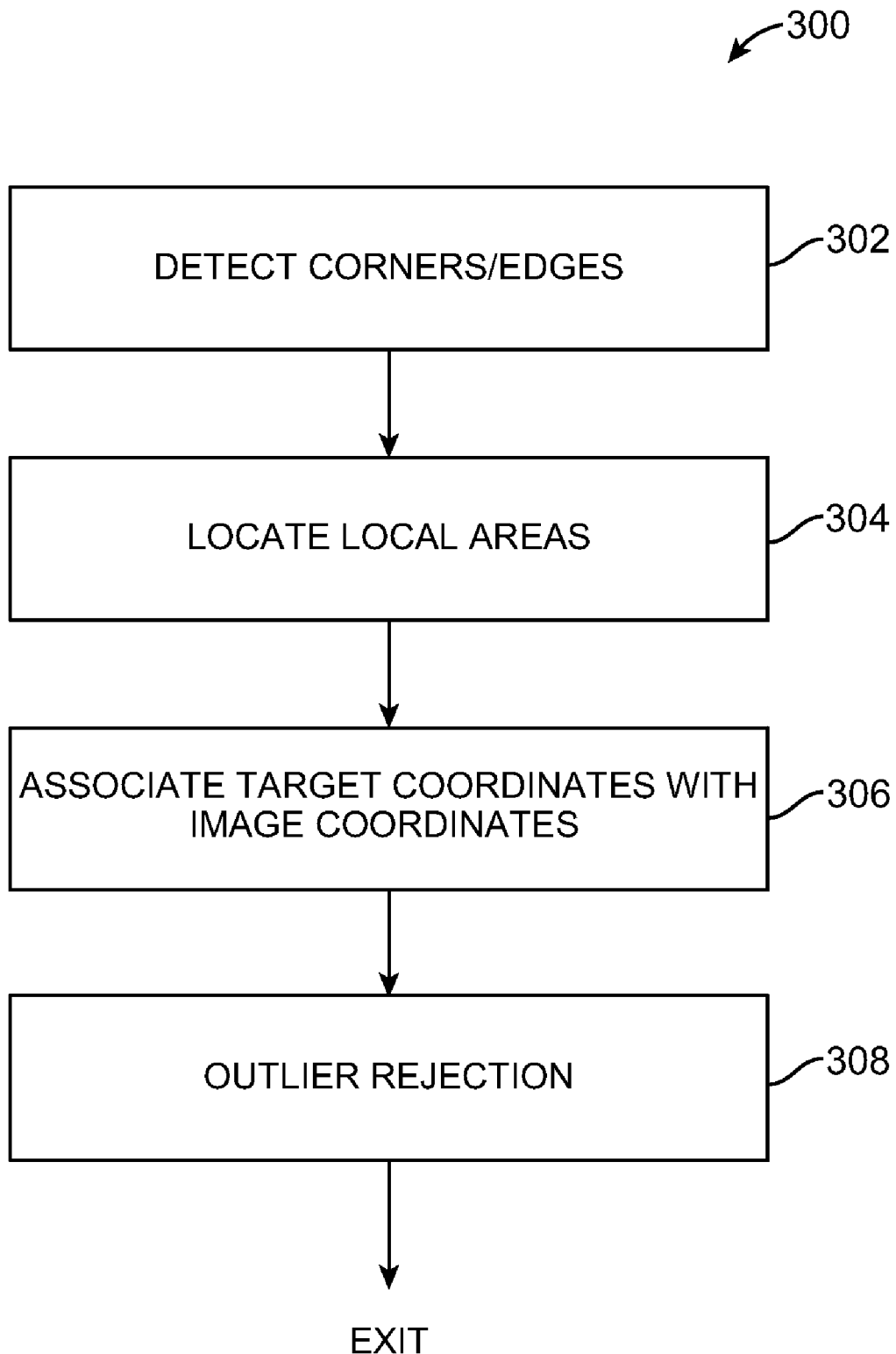
FIG. 15 is a flow diagram for a method that can be used for processing an image of the calibration target of FIG. 14B.

FIG. 15 is a flow diagram for a method 300 that can be used for processing an image of the calibration target of FIG. 14B. In step 302, the corners and/or edges are detected. The detected corners and/or edges can be used to establish the neighborhood structure of the pattern. In step 304, local areas of the pattern are located. The localization can be done in two directions separately. A projective invariance called cross-ratio (see chapter 2 of R. Hartley and A. Zisserman "Multiple View Geometry in Computer Vision," Cambridge University Press, 2000) is defined by four points on a line; this value does not change under any perspective projection, and therefore it can be used to align the image with the calibration target. If the cross-ratio defined by the nearest four points in not unique in the calibration target, the next four points (with overlapping) can be considered/used until the four points used are unique in the calibration target. Methods using 2-D invariance also exist that work on surrounding features in both directions. RANSAC can also be used for outlier rejection as described above with reference to method 240 (shown in FIG. 11).

Target Image Pre-Warping

For a rotational calibration target, the target plane needs to have a non-orthogonal angle to the camera optical axis. In order to capture sufficient data in depth, the angle can be as small as approximately 45 degrees. In this case, the camera image of the target pattern has a significant perspective effect. The perspective effect includes, but is not restricted to, target features closer to the camera appearing to be larger than similar features that are farther from the camera, the aspect ratio of target features appearing to be changed, and parallel lines on the target appearing to converge (see e.g., such effects illustrated in the images shown in FIGS. 9A, 9B, and 13). The perspective effect can make feature detection more difficult, since the many constraints about the feature can not be easily enforced for the detection process. Even though feature detection processes, such as the barcode detection described herein, can detect target pattern features at a variety of viewpoints, feature detection can still benefit if most or all of the perspective effect is removed.

Figure 24:
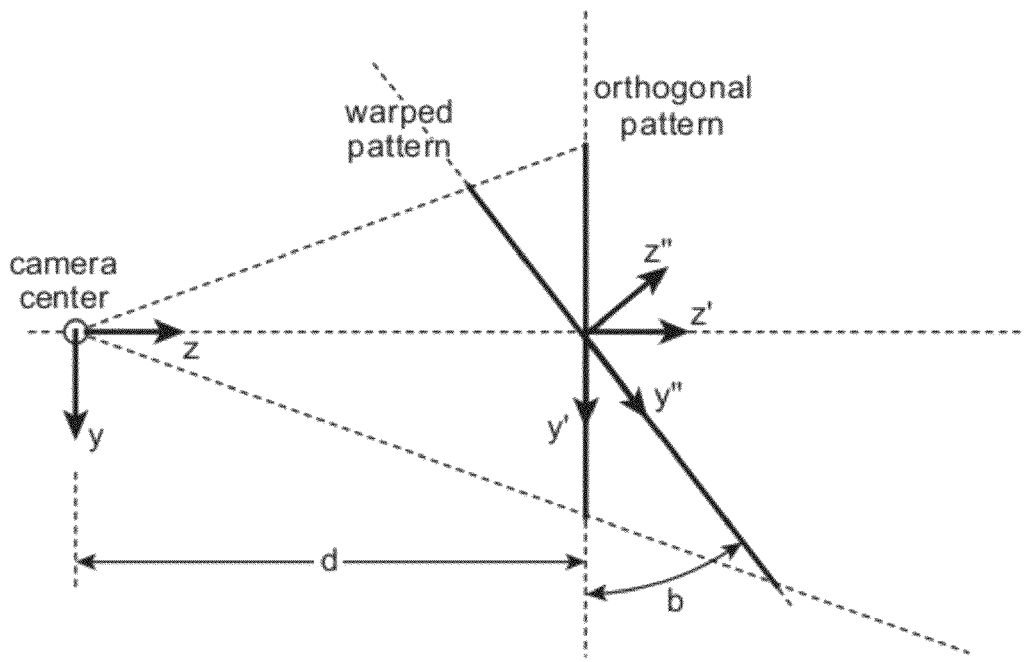
FIG. 24 is a diagrammatic view of two coordinate systems.

In the target design described herein, the rotational axis of the target approximately coincides with the optical axes of the cameras (there is a slight offset due to the left and right stereoscopic optical channels), and therefore the angle between the optical axes of the cameras and the target pattern is approximately a constant. The known angle of the target pattern plane with respect to the optical axis of a camera makes it possible to pre-warp the calibration target pattern by using a transformation to cancel out the perspective effect so that the pattern attached to a slanted plane looks approximately like an orthographic pattern. According to camera geometry, the orthographic pattern and the warped pattern are associated by the following equation 1:

$$\begin{bmatrix} x' \\ y' \\ z' \end{bmatrix} \sim \begin{bmatrix} d & 0 & 0 \\ 0 & \cos(b) & 0 \\ 0 & \sin(b) & d \end{bmatrix} \begin{bmatrix} x'' \\ y'' \\ z'' \end{bmatrix} \quad (1)$$

where [x', y', z'] is the coordinate system attached to the orthographic pattern, [x", y", z"] is the coordinate system attached to the warped pattern, d is the distance from camera center to the orthographic pattern, and b is the angle between the orthographic plane and the slanted plane, as shown in FIG. 24. It can be seen that the transformation is not related to the focal length of the camera.

Figure 25A:
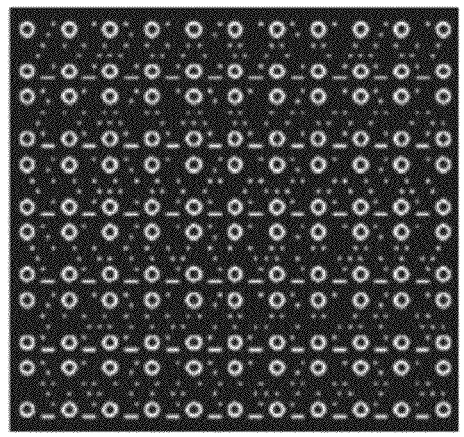
FIG. 25A is a plan view of a target pattern.
Figure 25B:
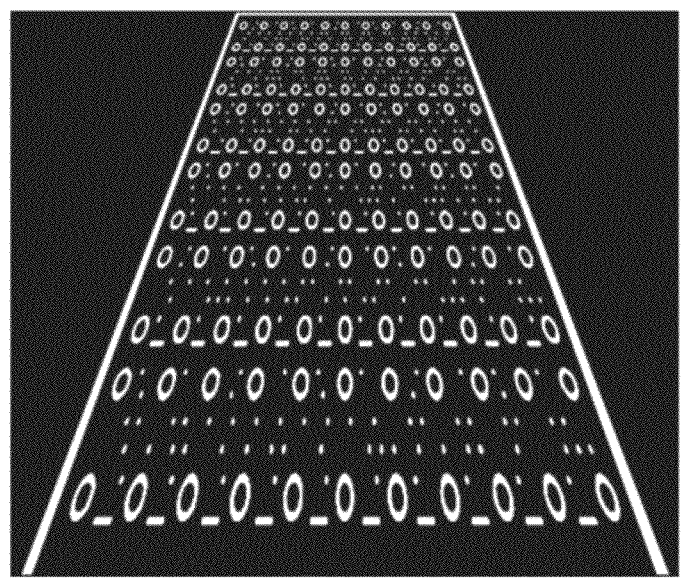
FIG. 25B is a plan view of a pre-warped target pattern.
Figure 25C:
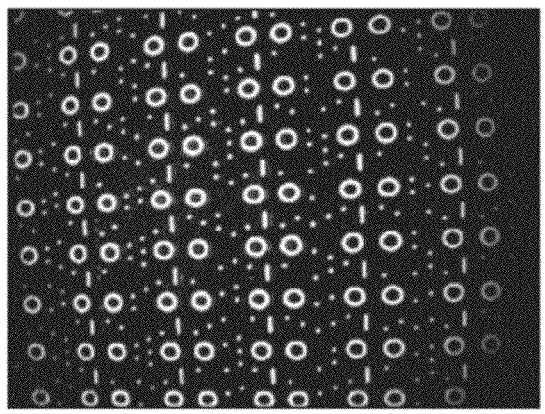
FIGS. 25C-25E are images of a slanted pre-warped target pattern at various camera rotation angles.
Figure 25D:
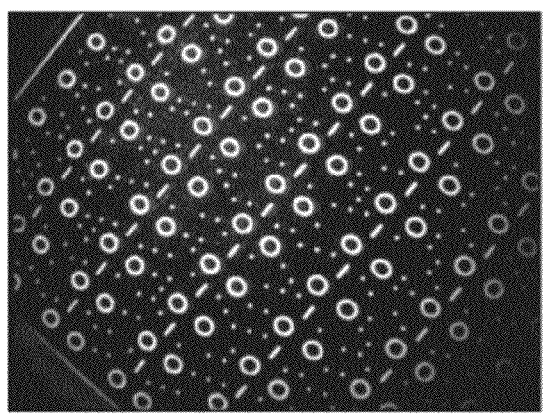
Figure 25E:
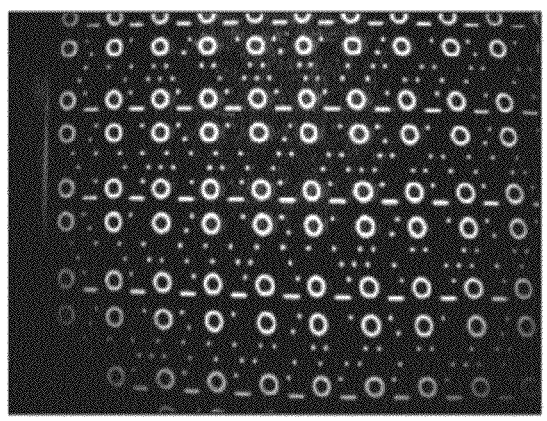

FIG. 25A is a plan view of an illustrative target pattern used for imaging and calibration as described herein. FIG. 25B is a plan (normal) view of a pre-warped version of the target pattern in FIG. 25A. This pre-warped pattern is used for imaging, and it may be, e.g., printed and attached to the slanted target plane. Accordingly, since the angle between the camera axes and the target pattern plane is the same as the perspective angle of the pre-warped pattern, the imaged pre-warped pattern generally appears as the target image shown in FIG. 25A. FIGS. 25C, 25D, and 25E are illustrative images of the pre-warped target pattern shown in FIG. 25B at three illustrative rotational angles around the target's rotational axis (camera axes). As can be seen in FIGS. 25C (approximately 90-degree rotation), 25D (approximately 45-degree rotation), and 25E (approximately zero-degree rotation), these images of the pre-warped pattern generally look like the desired orthographic pattern shown in FIG. 25A. The majority of the perspective effect has been removed.

The example patterns shown in FIGS. 25A-25E are barcode patterns. A pre-warped target pattern may be used for various other patterns (e.g., a checker board pattern or other patterns) for the rotational target.

Imaging System Health Checks—Focus Function Metrics

A number of Focus Function derived metrics can be used to check the health of a imaging system. One set of Focus Function derived metrics will be described in detail below. These metrics can be applied throughout the lifecycle of a imaging system and can be used for a variety of purposes, such as for quality control, for detecting failures, for detecting functional degradation that may lead to a failure, and for conducting failure analysis of imaging system components. Such metrics can be particularly beneficial in critical applications, such as in minimally invasive robotic surgery employing an endoscopic imaging system, where increased reliability of the imaging system may help to reduce the occurrences of imaging system failures that cause the surgeon to convert the robot-assisted minimally invasive surgery to either open surgery or to standard laparoscopic surgery, or where the surgery has to be abandoned altogether. These metrics can be built into an imaging system's software and performed as a routine health check of imaging system components. The results of these routine health checks can be communicated with the user and/or communicated over a communication network to a field service engineer ("FSE") through remote access.

Figure 16A:
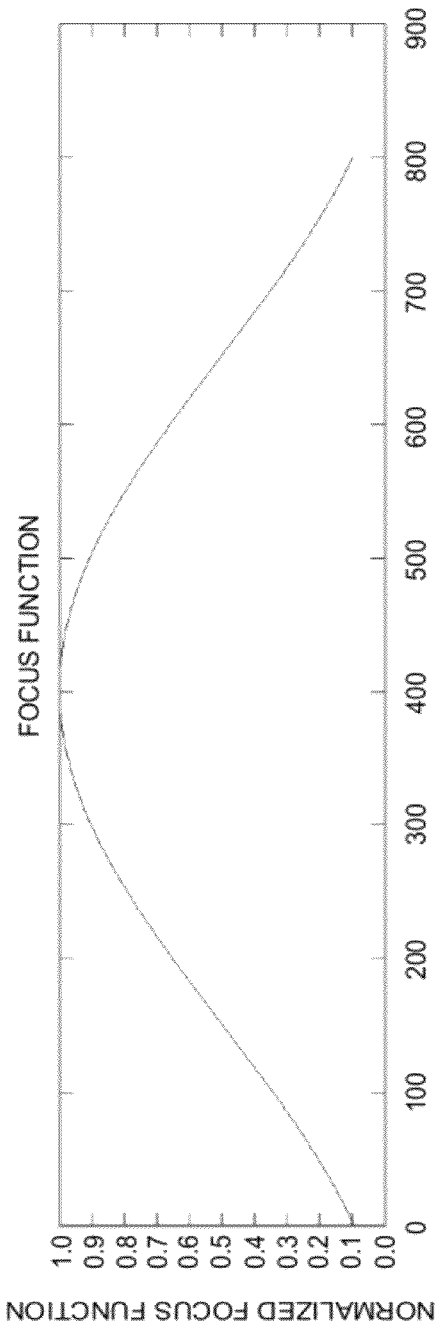
FIG. 16A illustrates a typical normalized Focus Function for a range of imaging system focal positions.
Figure 16B:
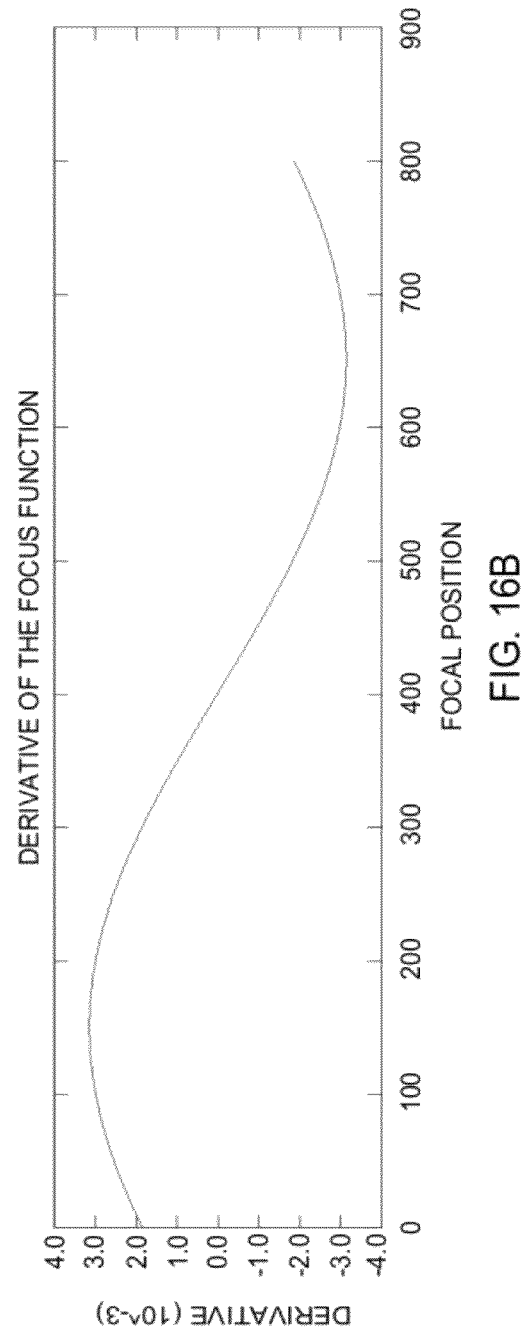
FIG. 16B illustrates the first derivative of the Focus Function of FIG. 16A.

A Focus Function can be produced by using an algorithm. FIG. 16A illustrates a typical normalized Focus Function for a range of imaging system focal positions. The focal position that maximizes the normalized Focus Function (i.e., the normalized Focus Function equals 1.0) is the focal position that provides the best focus for the imaging system. The algorithm can be implemented with or without an encoder. Where an encoder is not used, the algorithm can use the first derivative of the Focus Function as a gain term in a proportional controller. FIG. 16B illustrates the first derivative of the Focus Function of FIG. 16A. The use of the first derivative as the gain term causes the gain term to go to zero at the peak of the Focus Function. The proportional controller can implement a control loop algorithm with a "dead zone" to avoid oscillations around the peak of the Focus Function. An advantage of not using an encoder is that there is no encoder to fail. An advantage of using an encoder is that the system could drive directly to a previously known focal position associated with a known working distance.

Figure 17:
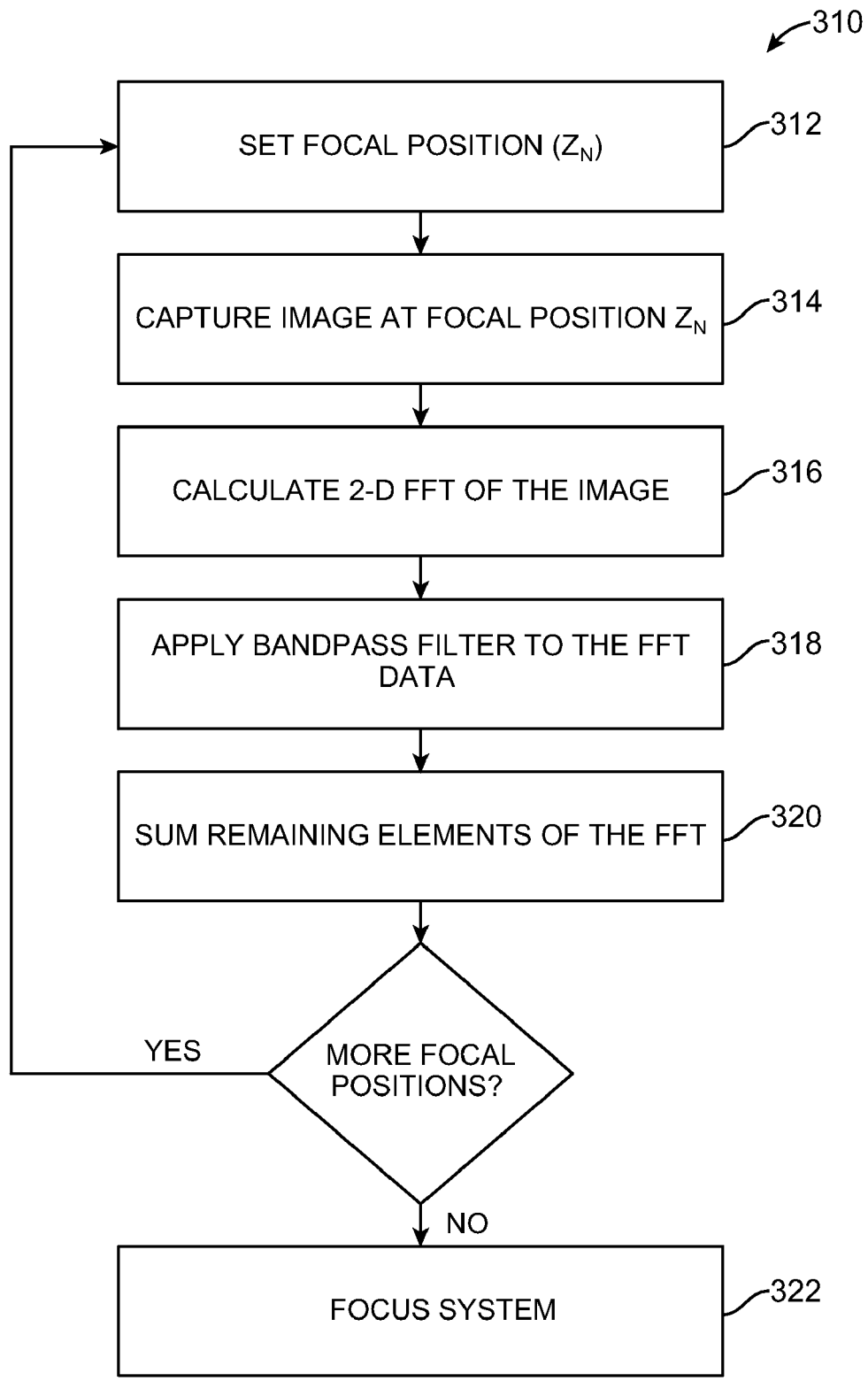
FIG. 17 illustrates a Focus Function algorithm.

FIG. 17 illustrates an algorithm 310. Algorithm 310 generates a Focus Function for a range of imaging system focal positions by processing images of a target of interest that is disposed at a substantially constant distance from the imaging system (e.g., the target position as illustrated in FIG. 6B where the entire target surface is oriented substantially parallel to the plane of the objective lens of the imaging system). The generated Focus Function data can be used to focus the imaging system and/or can be used to generate the Focus Function derived metrics described below. The range of focal positions can be sequentially processed, such as by starting at one end of the range (e.g., at focal position "0" of FIGS. 16A and 16B) and sequentially processing focal positions until the other end of the range is reached (e.g., focal position "800" of FIGS. 16A and 16B). Accordingly, the algorithm 310 includes an iteration loop that starts with step 312 in which a focal position ("$Z_N$") is set. An image is then captured in step 314 using the set focal position.

Where a target of interest is not disposed at a substantially constant distance from the imaging system, a small region of interest of the image that has a substantially constant distance from the imaging system can be processed. For example, in the images of FIGS. 9A and 9B, a region of interest from both images can be selected for processing that has a substantially constant distance from the imaging system, such as a region of interest that contains dark line 212 and a small portion of the white background that surrounds dark line 212. Many such regions of interest can be used. For example, when a calibration fixture is used that results in a constant imaging direction relative to a direction normal to the target plane (e.g., the calibration fixtures and illustrated field-of-views of FIGS. 3A, 4A, 4B, 5, 7A, and 7B), a small region of interest for any particular image can be selected based upon the orientation of the target in the image so as to process a small common portion of the target, which will maintain a substantially constant distance from the imaging system.

In step 316, the 2-D Fast Fourier Transform ("FFT") of the image is calculated using known methods. As an alternative to FFT, a simple magnitude of image gradient can be calculated using known methods. The FFT or the magnitude of image gradient can be computed along edge features only to avoid potential contributions from noisy white background. In addition, the computation of the FFT or the magnitude of image gradient can be restricted to areas of straight edges to avoid potential complications associated with curved features (e.g., circles and/or dots).

In step 318, a bandpass filter is applied to the 2-D FFT data by masking the DC components (doesn't contain sharpness information) and the high frequency components (noise). The cutoffs for the filter are based on the spatial sampling rate of the image (i.e., the resolution of the image). The mask ends up looking like an annulus.

In step 320, the remaining elements of the 2-D FFT are summed, which produces the Focus Function value for the set focal position (i.e., FF($Z_N$) is the Focus Function value for focal position $Z_N$). Steps 312 through 320 can be repeated for additional focal positions in the range of focal positions to be processed. The resulting collection of Focus Function values can be used in step 322 to focus the imaging system.

Figure 18:
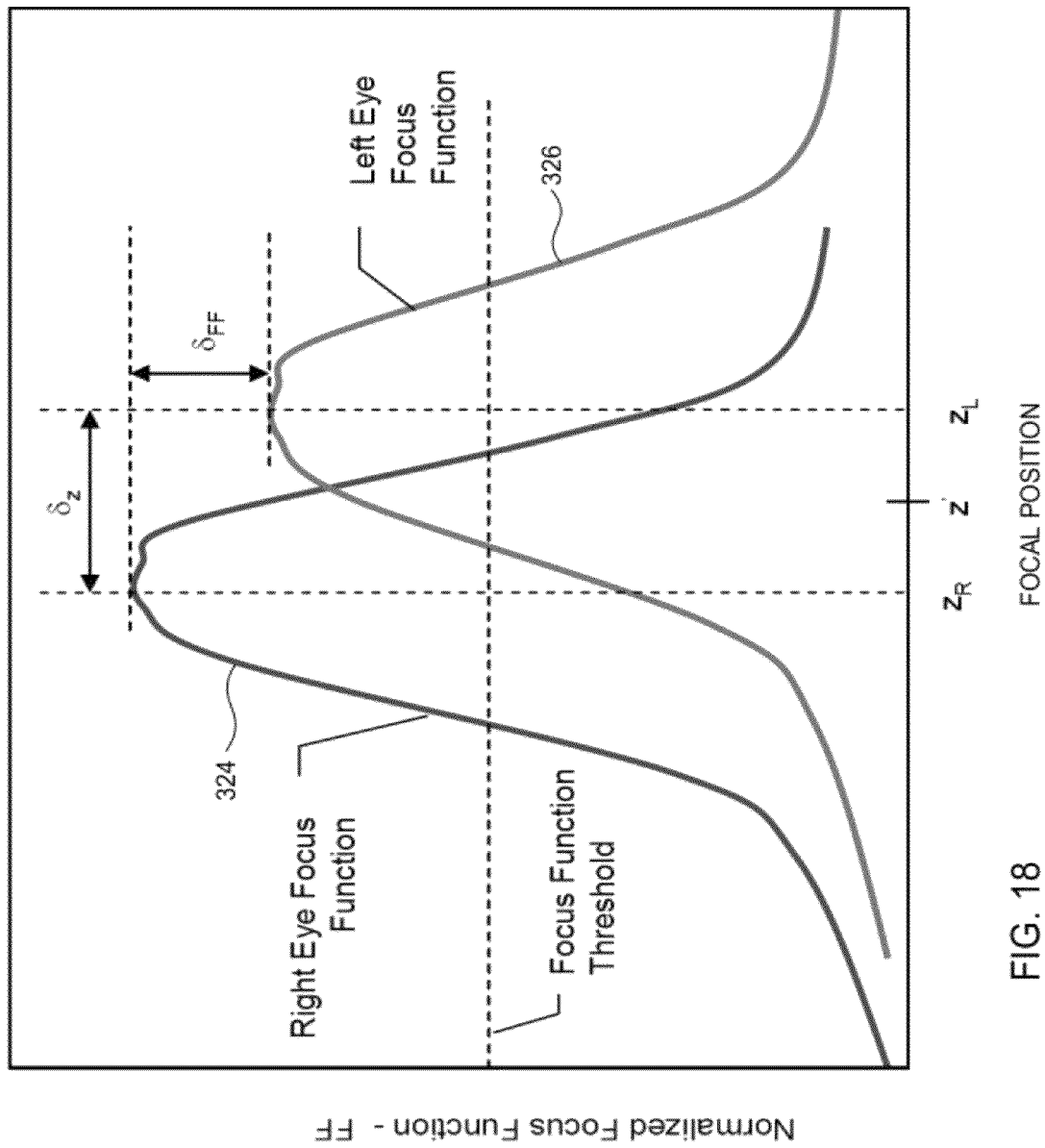
FIG. 18 illustrates a number of Focus Function derived metrics that can be used to check the health of an imaging system.

FIG. 18 illustrates a number of Focus-Function-derived metrics that can be used to check the health of an imaging system, such as a stereoscopic endoscope imaging system. FIG. 18 shows Focus Function plots for a stereo imaging system, which include a plot of a right eye Focus Function 324 and a plot of a left eye Focus Function 326. The right eye Focus Function 324 is maximized at focal position ($Z_R$) and the left eye Focus Function 326 is maximized at focal position ($Z_L$). Ideally, $Z_L$ equals $Z_R$. However, there will typically be some difference ($\delta_Z$) between the optics for each eye, and therefore $Z_L$ will typically be slightly different from $Z_R$. If the focal position difference $\delta_Z$ is too large, then it will hinder the performance of the imaging system and it will be impossible to choose a focal position that works for both eyes. Accordingly, the focal position difference $\delta_Z$ should not exceed some threshold ($T_Z$). This constraint can be used in quality control (e.g., by imposing it at the time of imaging system manufacture) and can be used over time as a health metric for the imaging system, as shown in equation 2 below.

$$\delta_Z < T_Z \qquad (2)$$

The peak value of the Focus Function represents the sharpness of the image. Ideally, the right eye Focus Function 324 at focal position $Z_R$ will equal the left eye Focus Function 326 at focal position $Z_L$. However, there will typically be some difference ($\delta_{FF}$) between these two values due to differences in the optical paths. If the Focus Function peak value difference $\delta_{FF}$ is too large, then the right and left images will not have the same sharpness, again hindering the performance of the imaging system. Accordingly, the difference in Focus Function peak values $\delta_{FF}$ should not exceed some threshold ($T_{FF}$). This constraint can be used in quality control and can be used as an ongoing health metric for the imaging system, as shown in equation 3 below. If $\delta_{FF}$ exceeds $T_{FF}$, then a warning message can be displayed to the user and/or sent over a communication network to indicate a problem with the imaging system.

$$\delta_{FF} < T_{FF} \qquad (3)$$

Prior to normalization, the peak Focus Function values can be evaluated to determine whether they meet a minimum threshold. In one approach, prior to normalization the peak left eye Focus Function and the peak right eye Focus Function can be compared against a minimum standard Focus Function to ensure acceptable imaging resolution is being achieved. In another approach, the Focus Function values determined can be normalized by using a peak Focus Function value from a selected imaging system (e.g., a system having a best resolution) and a minimum acceptable Focus Function Threshold value set accordingly.

Because the best focal position for the left eye Focus Function $Z_L$ will not typically equal the best focal position for the right eye Focus Function $Z_R$, it may be necessary to select a common focal position (Z'). While the common focal position Z' could be selected to be either $Z_L$ or $Z_R$, this would leave the eye using the unselected optical path out of focus. Therefore, it can be advantageous to set the common focal position Z' as the midpoint between $Z_L$ and $Z_R$. The common focal position Z' should not change over time for a given image distance and imaging system (e.g., a particular endoscope and camera combination. Additionally, for any given imaging distance, the common focal position Z' can be constrained within set bounds (i.e., between a minimum common focal position ($Z_{MIN}$) and a maximum common focal position ($Z_{MAX}$)) for all imaging systems of a particular group and/or design, such as for all endoscope/camera combinations of a particular group and/or design. This constraint can be used for manufacturing quality control and can be used over time as a quality metric on the health of the imaging system, as shown in equation 4 below.

$$Z_{MIN} < Z' < Z_{MAX} \qquad (4)$$

Imaging System Health Checks—MTF and Relative MTF

Figure 19:
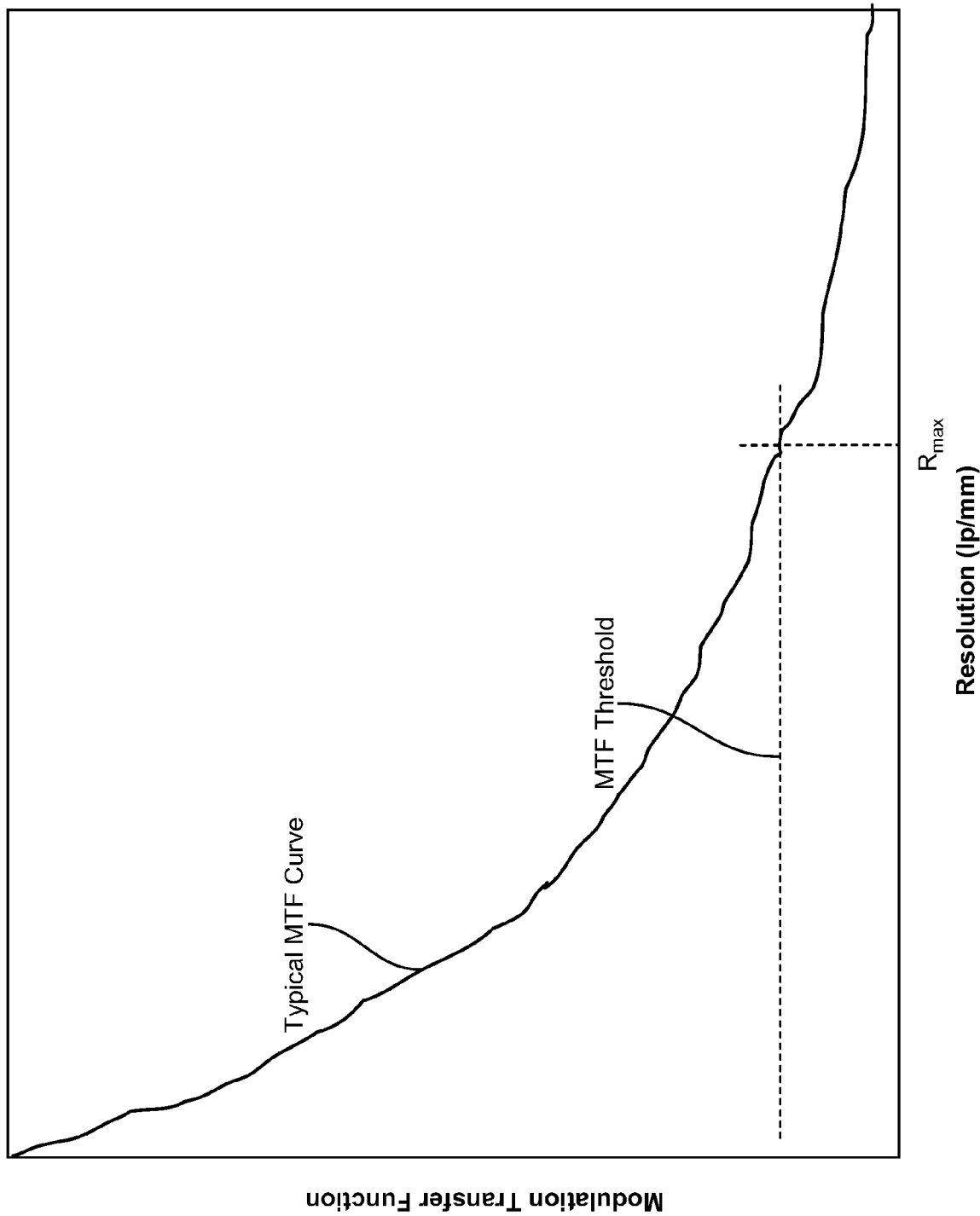
FIG. 19 illustrates a typical MTF curve for an imaging system.

Modulation Transfer Function (MTF) is a measure of contrast and resolution of an imaging system. FIG. 19 illustrates a typical MTF curve for an imaging system. In order to ensure a minimum level of performance of an imaging system with regard to contrast and resolution, one or more MTF threshold values can be specified. For example, the MTF value at the maximum resolution of the imaging system ($MTF(R_{MAX})$) can be required to be greater than ten percent.

A "relative MTF" measurement can also be used to monitor the health of an imaging system. A relative MTF measurement compares two images of an arbitrary target, thereby providing two MTF curves that can be compared to detect any resolution differences between the two images. FIGS. 20A and 20B show two images that were generated from a portion of a tissue image. FIG. 20A shows the portion as taken from the original tissue image. FIG. 20B shows the same portion, but the image was blurred using a 4×4 Gaussian kernel. The difference in resolution between these images is easily distinguished with the naked eye. The images of FIGS. 20A and 20B simulate two different images of a common arbitrary target taken by two imaging systems having different resolutions. FIGS. 20C and 20D each show the 2-D FFT for the images of FIGS. 20A and 20B, respectively. The FIG. 20D 2-D FFT for the blurred image of FIG. 20B shows a loss of high-frequency information as compared to the FIG. 20C 2-D FFT for the original image of FIG. 20A. Also, the 2-D FFT for the blurred image has much less noise components.

Figure 21:
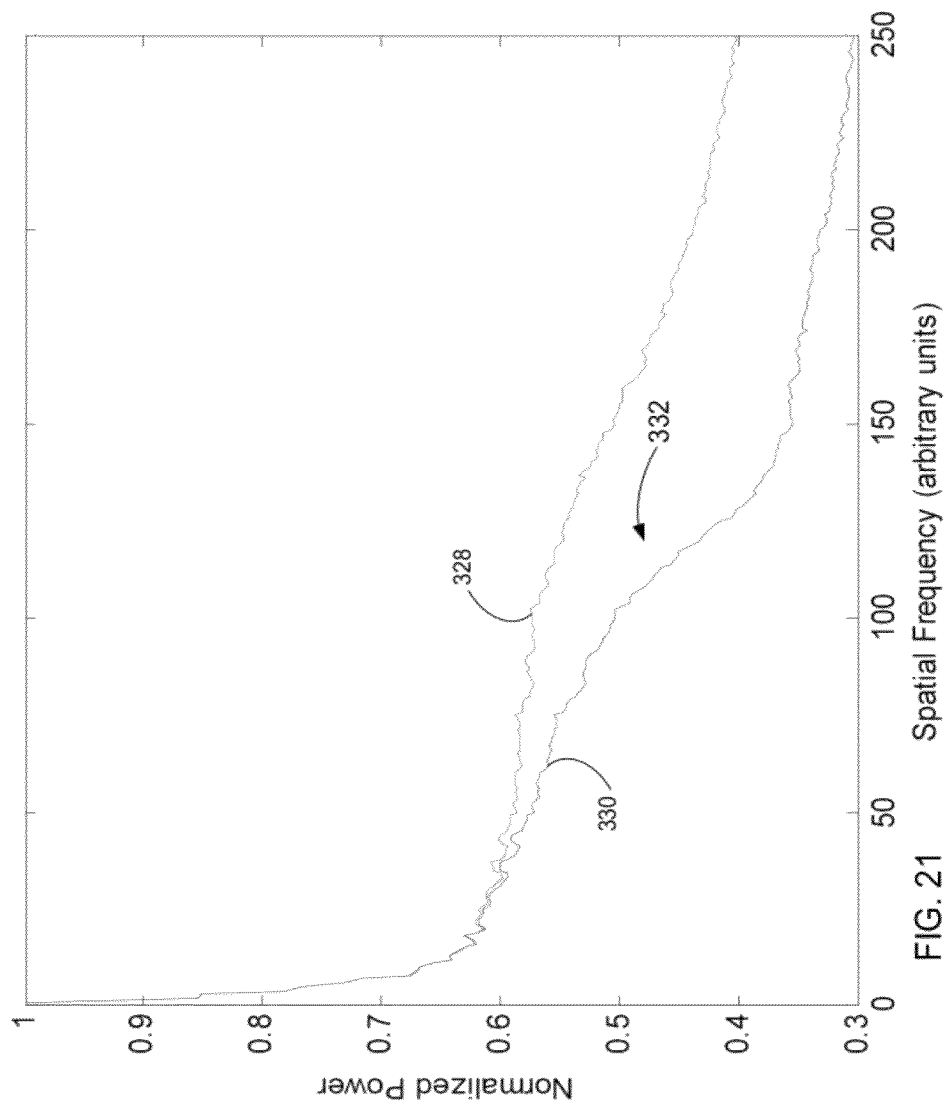
FIG. 21 shows relative MTF curves for the images of FIGS. 20A and 20B, respectively.

FIG. 21 shows a comparison between a relative MTF curve 328 calculated from the 2-D FFT of FIG. 20C (i.e., the 2-D FFT for the non-blurred image) and a relative MTF curve 330 calculated from the 2-D FFT of FIG. 20D (i.e., the 2-D FFT for the blurred image). Curve 328 is disposed above curve 330, thereby illustrating the relatively higher resolution of the original image as compared to the blurred image. Curve 330 for the blurred image exhibits a steep drop off 332. Such a steep drop off may be indicative of a "resolution limit" of an imaging system used to capture the corresponding image processed.

FIGS. 22A, 22B, 22C, 22D and 23 illustrate the ability of relative MTF calculations to discern more subtle differences in the resolution between two images. FIGS. 22A and 22C are identical to FIGS. 20A and 20C (repeated for comparison purposes). FIG. 22B shows a slightly blurred version of the original image of FIG. 22A. The image of FIG. 22B was blurred using a 3×3 gaussian kernel. The difference in resolution between these images is not easily distinguished with the naked eye. FIG. 22D shows the 2-D FFT for the slightly blurred image. It is more difficult to determine if the 2-D FFT for the slightly blurred image (FIG. 22D) has less high-frequency content than the 2-D FFT for the original unblurred image (FIG. 22C). However, it can still be seen that the 2-D FFT for the original unblurred image has higher-frequency components that represent noise, and that these noise components are not present in the 2-D FFT for the slightly blurred image.

Figure 23:
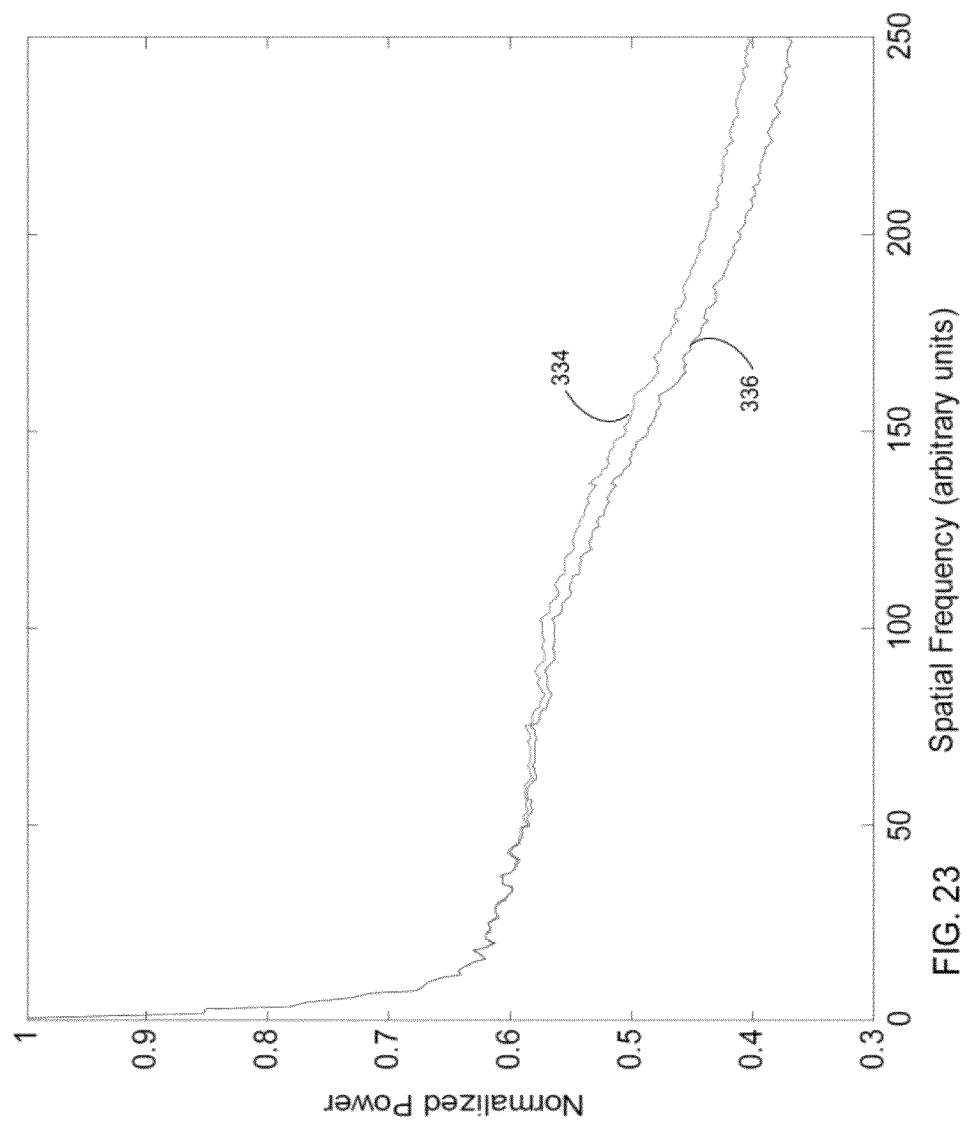
FIG. 23 shows relative MTF curves for the images of FIGS. 22A and 22B, respectively.

FIG. 23 shows the resulting relative MTF curves for the original unblurred image of FIG. 22A and the slightly blurred image of FIG. 22B. From FIG. 23, it is easier to see the resolution differences between the original unblurred image (curve 334) and the slightly blurred image (curve 336). Such curves can be used to make quantitative judgments about the differences in resolution between the two images and thus about differences in resolution between the imaging systems used to capture the two images. For example, the respective relative MTF values for the two images at a particular spatial frequency can be used to calculate a percentage contrast difference at that spatial frequency.

Relative MTF calculations can be used to be used to gain insight into the relative frequency and contrast characteristics of two imaging systems. The approach requires that two images be taken of the same object using the same field of view. The object imaged can be a calibration target, such as one of the above-described calibration targets. The above-described calibration targets contain sharp edge features, which should have sufficient spatial frequencies to generate relative MTF values at various resolutions. By comparing the resulting relative MTF curves for the images and/or the resulting 2-D FFTs for the images, relative differences between the two imaging systems can be determined. Similar to the above-discussed Focus Function, relative MTF can be calculated for each image path in a stereo imaging system. The target should be at a constant depth to the camera or it may be difficult to separate the blur due to out of focus problems and other problems. To be used with an inclined target, a region-of interest having a relatively constant depth can be used.

Relative MTF calculations can be used to quantify the health of a imaging system. For example, relative MTF calculations can be used as a quality control metric during the manufacture of the imaging system, as a quality control metric during integration of the imaging system, as a routine health check of a imaging system that can be built into system software for the imaging system, and as a failure analysis tool for use on imaging system components. The results of the relative MTF calculations can be reported to the imaging system user and/or reported over a communication network (e.g., to a field service engineer).

Imaging System Health Checks—Other Metrics

The amount of adjustment required to align the separate optical paths in a stereo imaging system can be used as a health check metric. Alignment of the separate optical paths can be performed automatically using a cross-correlation technique. For a given target (e.g., a calibration or alignment target) and imaging system, the X shift ($S_X$) and the Y shift ($S_Y$) required to align the separate optical paths should be smaller than pre-defined thresholds (ShiftMax_X and ShiftMax_Y), respectively, as shown in equations 5 and 6, below. If an alignment shift exceeds its threshold it may be indicative of a problem with the imaging system, such as a problem with the endoscope or the camera assembly in an endoscopic imaging system.

$$S_X < \text{ShiftMax\_X} \quad (5)$$

$$S_Y < \text{ShiftMax\_Y} \quad (6)$$

The brightness of an image of a target can be used as a health check metric. The brightness of the image can depend upon the amount of illumination delivered and the health of the image capture system. The amount of illumination delivered can vary depending upon the health of the illumination system. For example, the amount of illumination delivered in an exemplary endoscopic imaging system can depend upon the health of the lamp and the health of the fiber illuminator cables. The health of the image capture system can depend upon the health of image capture components, such as a charge-coupled device, a camera control unit, or an optical path. By controlling the illumination system to ensure that the illuminator is set at a known value (for example the maximum value) and controlling the image capture system (e.g., the camera control unit) so that it is not compensating for the brightness of the image of the target, the amount of illumination measured from the image can be indicative of the health of the illumination system and/or the health of the image capture system and compared against a threshold level ($T_L$) for each optical path (e.g., illumination measured from the left eye image ($L_L$) and illumination measured from the right eye image ($L_R$)), as shown in equations 7 and 8 below. When the measured illumination level drops below the threshold level, a lamp change and/or diagnostic maintenance can be recommended to the user. Additionally, the illumination status can be reported to the user or sent out over a communication network.

$$L_R > T_L \quad (7)$$

$$L_L > T_L \quad (8)$$

It is understood that the examples and embodiments described herein are for illustrative purposes and that various modifications or changes in light thereof will be suggested to a person skilled in the art and are to be included within the spirit and purview of this application and the scope of the appended claims. Numerous different combinations are possible, and such combinations are considered to be part of the present invention.

What is claimed is:

1. An endoscope calibration system, the system comprising:
   a calibration target;
   an interface assembly having first and second portions, wherein the first portion is adapted to receive an endoscope, wherein the second portion is adapted to receive the calibration target, wherein the first and second portions are rotatably coupled to each other, wherein the endoscope is positioned to capture an image of the calibration target when the endoscope is received by the first portion and the calibration target is received by the second portion, and wherein the image of the calibration target rotates in an image plane of the endoscope as one of the first and second portions rotates relative to the other one; and
   a processor configured to cause one of the first and second portions to rotate relative to the other so that images of the calibration target captured by the endoscope when the endoscope is received by the first portion and the calibration target is received by the second portion are captured at different rotation angles, process the images of the calibration target to generate calibration data, and use the calibration data to calibrate the endoscope.

2. The system of claim 1, wherein the field of view of the endoscope is angled away from a longitudinal axis of the endoscope, and wherein the longitudinal axis of the endoscope is at an acute angle relative to a plane of rotation between the first and second portions when the endoscope is received by the first portion.

3. The system of claim 1, wherein the field of view of the endoscope is aligned with a longitudinal axis of the endoscope, and wherein the longitudinal axis of the endoscope is normal to a plane of rotation between the first and second portions when the endoscope is received by the first portion.

4. The system of claim 1, wherein the first portion has first and second receptacles, wherein a longitudinal axis of the first receptacle is at an acute angle relative to a plane of rotation between the first and second portions, and wherein a longitudinal axis of the second receptacle is normal to the plane of rotation.

5. The system of claim 1, further comprising: means for changing an orientation of a surface of the calibration target relative to a viewing direction of the endoscope by pivoting the calibration target about a pivot point on the calibration target when the calibration target is received by the second portion.

6. The system of claim 5, wherein the pivoting of the calibration target about the pivot point is performed in coordination with the rotation of the one of the first and second portions relative to the other one.

7. The system of claim 1, wherein the calibration target includes a plurality of markers, wherein each of the plurality of markers includes a plurality of localizer features arranged on a surface of the calibration target in a pattern that indicates an orientation of the calibration target in the image of the calibration target captured by the endoscope, and wherein each of the plurality of markers includes a plurality of identification features for uniquely identifying the marker.

8. The system of claim 7, wherein the plurality of identification features comprises a plurality of potential dot locations, and wherein an identity of each marker is indicated by a presence or absence of a dot in each of the plurality of potential dot locations.

9. The system of claim 7, wherein the processor is configured to generate the calibration data using the plurality of markers in the image of the calibration target captured by the endoscope.

10. The system of claim 9, wherein the calibration target includes an edge feature separating dark and bright regions, and the processor is configured to generate modulation transfer function values by processing an image region of interest that includes the edge feature.

11. The system of claim 9, wherein the processor is configured to generate a color balance adjustment for the imaging system by processing a region of interest of an image of the calibration target.

12. The system of claim 11, wherein the color balance adjustment comprises a white balance adjustment.

13. The system of claim 12, wherein the calibration target comprises a white background and non-white calibration features.

14. The system of claim 1, wherein the endoscope comprises a stereoscopic endoscope.

15. An endoscope calibration system comprising:
a calibration target;
an interface assembly configured to receive an endoscope to be calibrated, receive the calibration target, adjustably tilt the calibration target, and cause an image of the calibration target that is captured by the endoscope to adjustably rotate within an image plane of the endoscope; and
a processor configured to cause the interface assembly to adjustably tilt the calibration target and cause successive images of the calibration target to be captured by the endoscope at different rotation angles within the image plane of the endoscope when the endoscope and the calibration target are received by the interface assembly, process the images of the calibration target to generate calibration data by at least determining at least one of whether a predetermined Focus Function focal position difference is exceeded and whether a predetermined Focus Function peak value difference is exceeded, and use the calibration data to calibrate the endoscope.

16. A method for calibrating an endoscopic imaging system using a calibration target, the method comprising:
imaging the calibration target with the imaging system from a first spatial arrangement established between the calibration target and the imaging system by using a calibration fixture;
imaging the calibration target with the imaging system from a second spatial arrangement established between the calibration target and the imaging system by using the calibration fixture to cause an image of the calibration target that is captured by the imaging system to rotate to a second rotation angle that is different from a first rotation angle of the first spatial arrangement;
processing the imaging of the calibration target to generate data; and
calibrating the endoscopic imaging system by using the generated data.

17. The method of claim 16, wherein the generation of data comprises: processing one of the first and second images to generate relative modulation transfer function values.

18. The method of claim 16, wherein the generation of data comprises: processing a region-of interest of one of the first and second images to generate modulation transfer function values from an edge feature that separates dark and bright regions.

19. The method of claim 16, wherein the generation of data comprises: processing a region of interest of one of the first and second images to generate one or more color balance parameters for the imaging system.

20. The method of claim 19, wherein the one or more color balance parameters comprises one or more white balance parameters.

21. The method of claim 16, wherein the imaging system comprises a stereoscopic endoscope.

22. The method of claim 21, wherein the generation of data comprises: determining one or more metrics for the imaging system, wherein the one or more metrics indicate whether a predetermined Focus Function focal position difference is exceeded, whether a predetermined Focus Function peak value difference is exceeded, whether a predetermined alignment shift value is exceeded, or whether an illumination level falls below a predetermined illumination level.

23. The method of claim 16, wherein the calibration features include a plurality of localizer features that are used to determine an orientation for each marker.

24. A method for calibrating an endoscopic imaging system using a calibration target having a plurality of markers, each marker including a plurality of localizer features and a plurality of identification features,
imaging the calibration target with the imaging system from a plurality of spatial arrangements established between the calibration target and the imaging system by using a calibration fixture;
processing said images of the calibration target by identifying one or more markers in the images by using the plurality of identification features in the images, localizing the identified markers in the images by using the plurality of localizer features in the images, and generating calibration data from the calibration target in the images by using information of the localized markers in the images; and
using the calibration data to calibrate the endoscopic imaging system.

* * * * *